United States Patent
Koch et al.

(10) Patent No.: US 12,300,197 B2
(45) Date of Patent: May 13, 2025

(54) SYSTEMS AND METHODS FOR IMPROVED PRODUCTION AND PRESENTATION OF VIDEO CONTENT

(71) Applicant: New Revolution Tools, LLC, Farley, IA (US)

(72) Inventors: Kevin Koch, Farley, IA (US); Trent Moeller, Dubuque, IA (US); Tony Wagner, Dubuque, IA (US)

(73) Assignee: New Revolution Tools, LLC, Farley, IA (US)

( * ) Notice: Subject to any disclaimer, the term of this patent is extended or adjusted under 35 U.S.C. 154(b) by 0 days.

(21) Appl. No.: 18/133,254

(22) Filed: Apr. 11, 2023

(65) Prior Publication Data

US 2023/0282186 A1 Sep. 7, 2023

Related U.S. Application Data

(62) Division of application No. 17/592,926, filed on Feb. 4, 2022, now Pat. No. 11,651,751.

(Continued)

(51) Int. Cl.
G06F 3/042 (2006.01)
G06F 3/14 (2006.01)
(Continued)

(52) U.S. Cl.
CPC ........... *G09G 5/363* (2013.01); *G06F 3/0425* (2013.01); *G06F 3/1431* (2013.01); *H04N 9/3179* (2013.01); *G09G 2340/125* (2013.01)

(58) Field of Classification Search
None
See application file for complete search history.

(56) References Cited

U.S. PATENT DOCUMENTS 8,355,038 B2 1/2013 Robinson et al.
9,160,966 B2 10/2015 Zhang et al.
(Continued)

FOREIGN PATENT DOCUMENTS

CN 201050740 Y 4/2008

OTHER PUBLICATIONS

Smithwick, "A Switched Emissive Transparent Display with Controllable per-pixel Opacity" Sep. 29, 2016 (Sep. 29, 2016), <URL: https://sid.onlinelibrary.wlley.com/doi/abs/10.1002/jsid.409 >, 11 pages.

(Continued)

*Primary Examiner* — David H Chu
(74) *Attorney, Agent, or Firm* — Rathe Lindenbaum LLP

(57) ABSTRACT

Systems and methods for production and presentation of video content are provided. The system can include a transparent panel and a camera positioned adjacent to the transparent panel. The camera can generate a camera signal indicative of image data of a user positioned on a side of the transparent panel opposing the camera. The system can further include a memory storing instructions and a processor configured to or programmed to read the instructions stored in the memory. The processor can be configured to or programmed to: receive the camera signal; receive an overlay signal having at least one visual element; overlay the at least one visual element of the overlay signal on the transparent panel; and control a display of the at least one visual element on the transparent panel such that the at least one visual element is visible to the user and not visible to the camera.

17 Claims, 15 Drawing Sheets

Related U.S. Application Data

(60) Provisional application No. 63/145,488, filed on Feb. 4, 2021.

(51) Int. Cl.
*G09G 5/36* (2006.01)
*H04N 9/31* (2006.01)

(56) References Cited

U.S. PATENT DOCUMENTS

| | | | |
|---|---|---|---|
| 9,277,172 | B2 | 3/2016 | Choi |
| 10,523,893 | B2 | 12/2019 | Anderson et al. |
| 12,058,479 | B2 | 8/2024 | Shen et al. |
| 2003/0030746 | A1 | 2/2003 | Manico et al. |
| 2003/0142037 | A1* | 7/2003 | Pinedo ............... G06F 3/1423 |
| | | | 345/1.1 |
| 2004/0051716 | A1 | 3/2004 | Sevigny |
| 2008/0150913 | A1 | 6/2008 | Bell et al. |
| 2010/0171765 | A1* | 7/2010 | Kim ............... H04N 21/4316 |
| | | | 345/1.3 |
| 2011/0261257 | A1* | 10/2011 | Terry ............ H04N 21/234318 |
| | | | 348/E9.034 |
| 2012/0322367 | A1* | 12/2012 | Kee ................ H04B 17/23 |
| | | | 455/41.1 |
| 2013/0132885 | A1* | 5/2013 | Maynard ............ G06F 3/04842 |
| | | | 715/777 |
| 2014/0101574 | A1* | 4/2014 | Maynard ............. G06F 3/0484 |
| | | | 715/761 |
| 2014/0365957 | A1* | 12/2014 | Louch ................. G09G 5/14 |
| | | | 715/790 |
| 2015/0227035 | A1* | 8/2015 | Joseph ................ G03B 35/24 |
| | | | 353/121 |
| 2016/0311374 | A1 | 10/2016 | May |
| 2020/0382681 | A1* | 12/2020 | Smithwick ......... H04N 9/3194 |
| 2021/0397399 | A1* | 12/2021 | Zhang .................. G09G 5/346 |
| 2022/0206667 | A1* | 6/2022 | Zhang .................... G09G 5/08 |
| 2022/0246113 | A1 | 8/2022 | Koch et al. |
| 2022/0360755 | A1 | 11/2022 | Shen |

OTHER PUBLICATIONS

International Search Report and Written Opinion for Application No. PCT/US2022/015321, dated Jun. 8, 2022, 12 pages.

U.S. Appl. No. 17/592,926, filed Feb. 4, 2022, 2022/0246113, Allowed.

International Preliminary Report on Patentability for Application No. PCT/US2022/015321, dated Aug. 17, 2023, 8 pages.

* cited by examiner

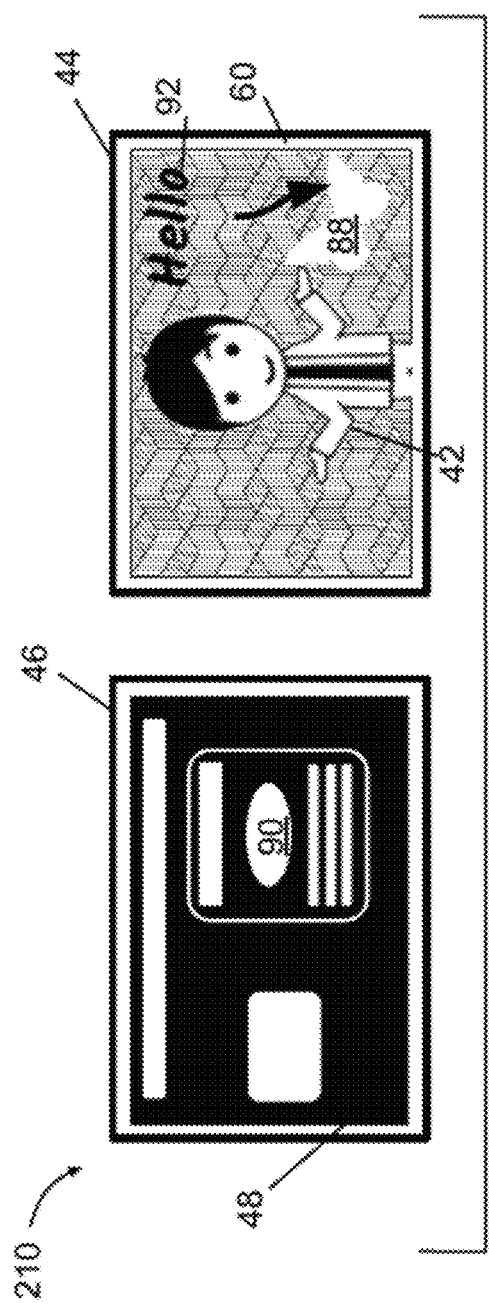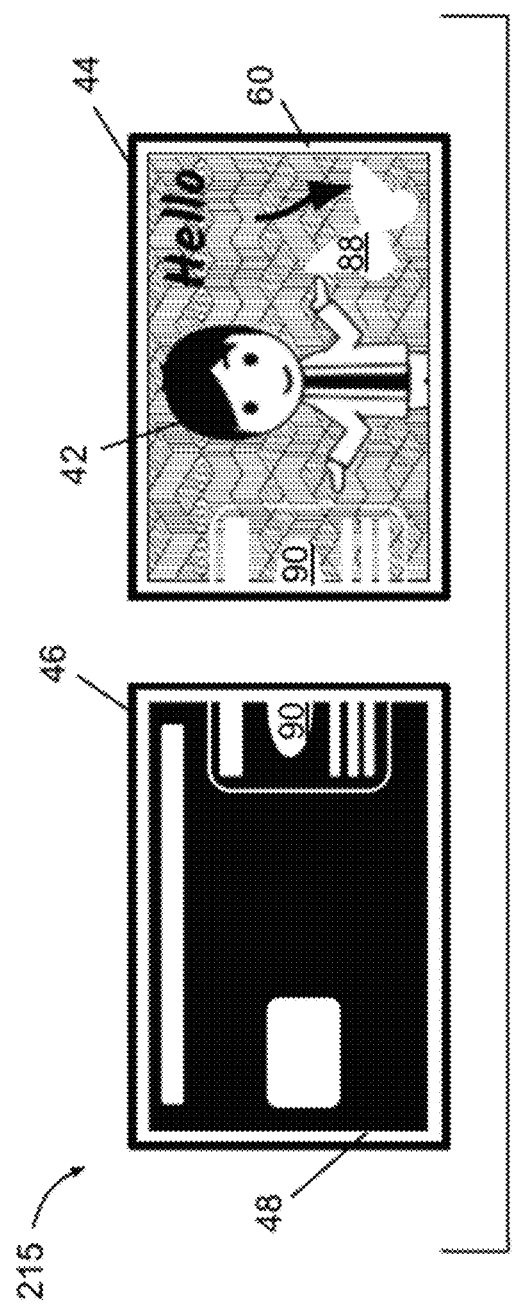

SYSTEMS AND METHODS FOR IMPROVED PRODUCTION AND PRESENTATION OF VIDEO CONTENT

RELATED APPLICATIONS

The present application is a divisional application of U.S. patent application Ser. No. 17/592,926 filed Feb. 4, 2022, which claims the benefit of and priority to U.S. Provisional Application Ser. No. 63/145,488 filed on Feb. 4, 2021, each of which is incorporated herein by reference in its entirety.

BACKGROUND

Related Art

Video content is an increasingly important communication medium for several fields including, but not limited to, academia (e.g., lectures, labs, distance education networks, etc.), business (e.g., meetings, trainings, etc.), and television (e.g., broadcasts). The production and presentation quality of video content can greatly impact the effectiveness of the video content in achieving desired goals. For example, a clear visual and audio representation of a presenter (e.g., a professor, a lab technician, an executive, a trainer, a news broadcaster, etc.) and the use of visual elements (e.g., text and graphics) can facilitate effective communication. However, the process of producing and presenting video content can be complex and require significant resources and time due to the required amount of audio/video equipment, coordination and editing time. Additionally, known approaches for producing video content utilize one or more light sources that can generate light reflections visible to video equipment (e.g., a camera). This can be problematic when light reflects from the eyes or eyeglasses of a presenter or any transparent material between the camera and the presenter. Conventional techniques for mitigating these reflections include moving the one or more light sources outside of a zone within which there is a reflection path from the one or more light sources, off a reflective surface and back to the camera or by diffusing the light emitted by the one or more light sources to soften a harshness or intensity of a reflection. However, these mitigation techniques can require additional studio space and video equipment.

As such, what is needed is a reduction in the current complexities, resources and time to produce and present video content.

SUMMARY

The present disclosure relates to systems and methods for improved production and presentation of video content.

Embodiments of the present disclosure can facilitate the production and presentation of video content by an efficient and intuitive workflow that adds visual elements to camera-shot video in real-time while providing visual feedback to a presenter to coordinate his/her interaction with these visual elements. Embodiments of the present disclosure can provide visual cues (e.g., a traceable element) that are only visible to a presenter to guide a presentation and/or eliminate light source reflections during video content production without the need for additional studio space and video equipment. Thus, embodiments of the present disclosure overcome the disadvantages of conventional video presentation and production technology by providing solutions in the form of systems and methods that, for example, can automatically, seamlessly and efficiently provide for the production and presentation of visually appealing and engaging video content that dynamically incorporates additional visual elements and/or visual feedback in real-time.

In one embodiment, a system is disclosed that includes a transparent panel. The system receives a camera signal indicative of image data of a scene that can include, for example, a user positioned behind the transparent panel, and receives an overlay signal having at least one visual element. The at least one visual element can be one or more of a text, a logo, an application window, a presentation slide, a drawing, a figure, a diagram, a chart, and a graph. The system processes the camera signal and the overlay signal to generate a first signal. In particular, the system flips the image data of the camera signal from left to right and transforms the at least one visual element utilizing, for example, a keying function. The keying function can be one of a chrominance keying function, a luminance keying function and shape keying function. The system displays a processed image of the first signal on a first display. The processed image is indicative of the at least one visual element overlaid on the image data of the scene. The system also displays an application window of a second signal on a second display. Based on a user input, the system relocates the application window from the second display to the overlay signal. The system displays the application window on the first display by transforming the application window utilizing the keying function and overlaying the transformed application window in the processed image of the first signal.

In another embodiment, the system comprises a transparent panel having an input responsive interface. The input responsive interface can be a capacitive system, a resistive system, an inductive system, an infrared beam system, and/or a gesture based sensor system. The system receives a camera signal indicative of image data of a scene that can include, for example, a user positioned behind the transparent panel, and receives, in response to a user input on the transparent panel, an input responsive signal indicative of user input data. The user input data can be one or more of text, a drawing, a figure, a diagram, a chart, and a graph. The system processes the camera signal and the input responsive signal to generate a first signal. In particular, the system flips the image data of the camera signal from left to right, generates a digital representation of the user input data and transforms the digital representation utilizing, for example, a keying function. The keying function can be one of a chrominance keying function, a luminance keying function and shape keying function. The system displays a processed image of the first signal on a first display. The processed image is indicative of the user input data overlaid on the image data of the scene. The system also displays an application window of a second signal on a second display. Based on a user input, the system relocates the application window from the second display to an overlay signal associated with the first signal. The system displays the application window on the first display by transforming the application window utilizing a keying function and overlaying the transformed application window in the processed image of the first signal.

In another embodiment, the system comprises a transparent panel, a sheet having a controllable opacity, and a projector having a shutter. The sheet can be fixed to a portion or an entirety of a surface of the transparent panel or can be integrally formed with the transparent panel. The system receives, from a camera positioned in front of the transparent panel, a camera signal indicative of image data of a user positioned behind the transparent panel. The system also receives an overlay signal having at least one visual element.

The system controls a display of the at least one visual element, projected by the projector, on the sheet by controlling an opacity of the sheet and the shutter of the projector such that the at least one visual element is visible to the user positioned behind the transparent panel and not visible to the camera. In particular, the system drives a first state for a first predetermined period where the sheet is semi-opaque and the shutter is open to display the at least one visual element on the semi-opaque sheet, and drives a second state for a second predetermined period where the sheet is transparent and the shutter is closed to preclude displaying the at least one visual element on the transparent sheet. Further, the system cycles between the first state and the second state such that the at least one visual element is visible to the user in the first state and the camera captures an image without the at least one visual element in the second state. In particular, the system cycles between the first state and the second state at a rate to enable persistence of vision to yield an impression to the user that the at least one visual element is continuously displayed.

In another embodiment, the system comprises a transparent panel having a substrate and a projector that projects polarized light. The system receives, from a camera positioned in front of the transparent panel, a camera signal indicative of image data of a user positioned behind the transparent panel. The system also receives an overlay signal having at least one visual element. The system controls a display of the at least one visual element, projected by the projector, onto the substrate of the transparent panel such that the at least one visual element is visible to the user positioned behind the transparent panel and not visible to the camera. In particular, the system provides for coordinating the polarization of the projected polarized light with a polarizing filter of the camera such that the projected polarized light is not visible to the camera.

In another embodiment, the system comprises a transparent panel having a plurality of lighted pixels. The system receives, from a camera positioned in front of the transparent panel, a camera signal indicative of image data of a user positioned behind the transparent panel. The system also receives an overlay signal having at least one visual element. The plurality of lighted pixels can be oriented to provide light in a direction of the user that is not visible to the camera. The system controls a display of the at least one visual element on the plurality of lighted pixels such that the at least one visual element is visible to the user positioned behind the transparent panel and not visible to the camera.

In another embodiment, the system comprises a transparent panel having a first plurality of lighted pixels and a second plurality of lighted pixels. The system receives, from a camera positioned in front of the transparent panel, a camera signal indicative of image data of a user positioned behind the transparent panel. The system also receives an overlay signal having at least one visual element. The first plurality of lighted pixels can be oriented to provide light in a direction of the user that is not visible to the camera and the second plurality of lighted pixels can be oriented in a direction of the camera. The system controls the display of the at least one visual element on the first plurality of lighted pixels such that the at least one visual element is visible to the user positioned behind the transparent panel and not visible to the camera and a display of a different at least one visual element on the second plurality of lighted pixels.

BRIEF DESCRIPTION OF THE DRAWINGS

The foregoing features of the present disclosure will be apparent from the following Detailed Description, taken in connection with the accompanying drawings, in which:

FIGS. 8B-C are diagrams illustrating an example application of the system of the present disclosure;

DETAILED DESCRIPTION

The present disclosure relates to systems and methods for improved production and presentation of video content as described in detail below in connection with FIGS. 1-14.

Figure 1:
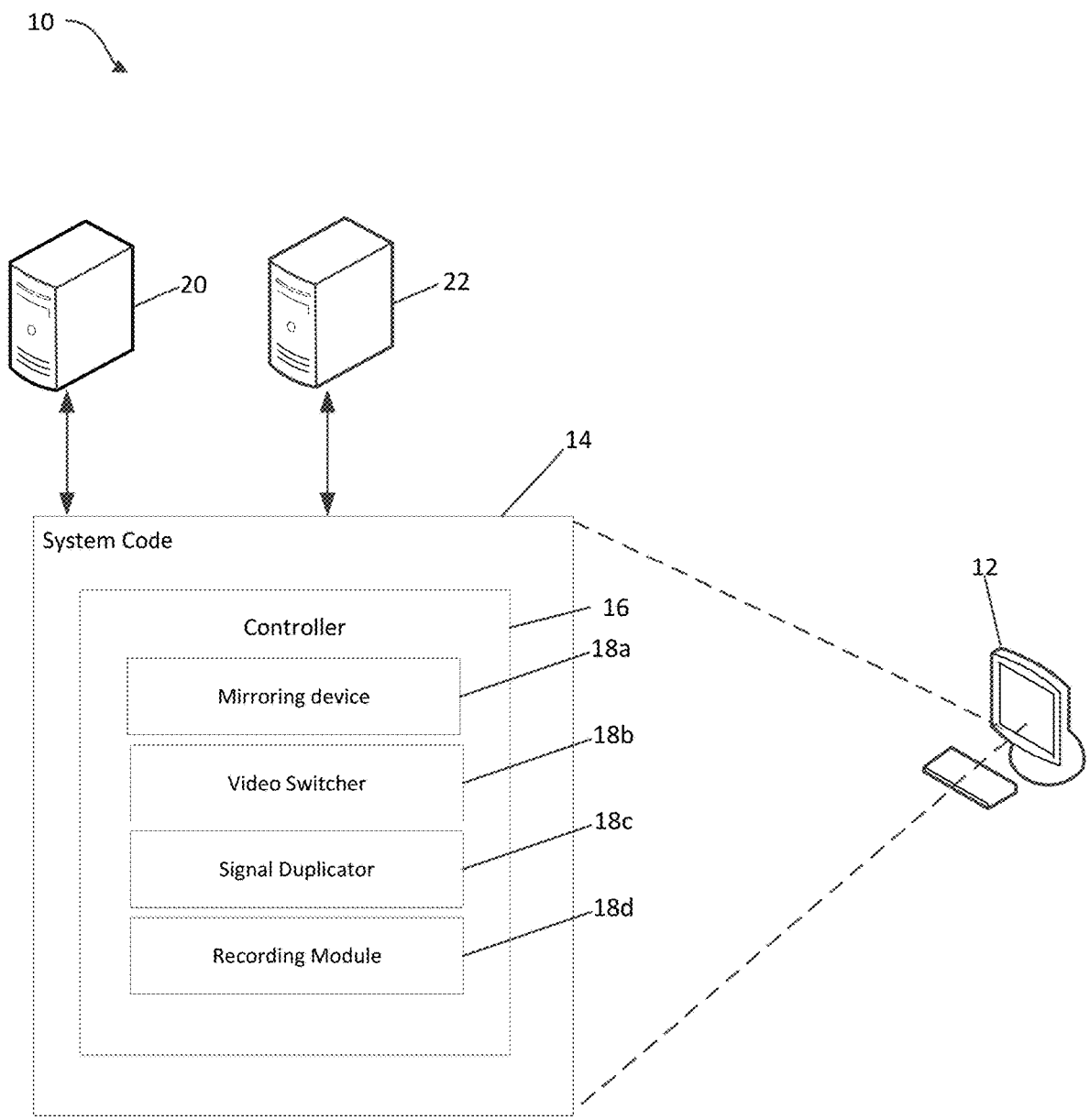
FIG. 1 is a diagram illustrating an embodiment of a system of the present disclosure.

Turning to the drawings, FIG. 1 is a diagram illustrating an embodiment of the system 10 of the present disclosure. The system 10 can include a central processing unit 12 (e.g. a hardware processor) of a computer system (e.g., a video content presentation system), a server 20 (e.g., a service for applications or services), and a database server 22. The hardware processor 12, the server 20 and the database server 22 can communicate via a communication network (not shown). The hardware processor 12 could include, but is not limited to, a personal computer, a laptop computer, a tablet computer, a smart telephone, a server, an embedded computer system (e.g., a processor of a presentation system), a microprocessor, and/or a cloud-based computing platform.

The system 10 also includes system code 14 (e.g., non-transitory, computer-readable instructions) stored on a non-transitory computer-readable medium and executable by the hardware processor 12 or one or more computer systems. The processor 12 executes the system code 14 which generates a presentation signal. In particular, the system code 14 could include various custom-written software modules that carry out the steps/processes discussed herein including, but not limited to, a controller 16 having a mirroring device 18a, a video switcher 18b, a signal duplicator 18c and a recording module 18d. The system code 14 could be programmed using any suitable programming or scripting languages including, but not limited to, C, C++, C #, Java, JavaScript, Python, Ruby, Swift, and/or any other suitable language. Additionally, the system code 14 could be distributed across multiple computer systems in communication with each other over a communication network, stored within hardware, and/or stored and executed on a cloud computing platform and remotely accessed by a computer system in communication with the cloud computing platform. As discussed in greater detail in connection with FIGS. 3-7, the system code 14 can communicate with the server 20 and the database 22 via a communication network, which could be stored on the same computer system as the system code 14, or on one or more other computer systems in communication with the system code 14. It should be understood that the controller 16 could be provided on the same system as the hardware processor 12 or be remote from the same system as the hardware processor 12.

Still further, elements of the system 10 can be embodied as a customized hardware component such as a field-programmable gate array ("FPGA"), application-specific integrated circuit ("ASIC"), embedded system, or other customized hardware component without departing from the spirit or scope of the present disclosure. It should be understood that FIG. 1 is only one potential configuration, and the system 10 of the present disclosure can be implemented using a number of different configurations.

Figure 2:
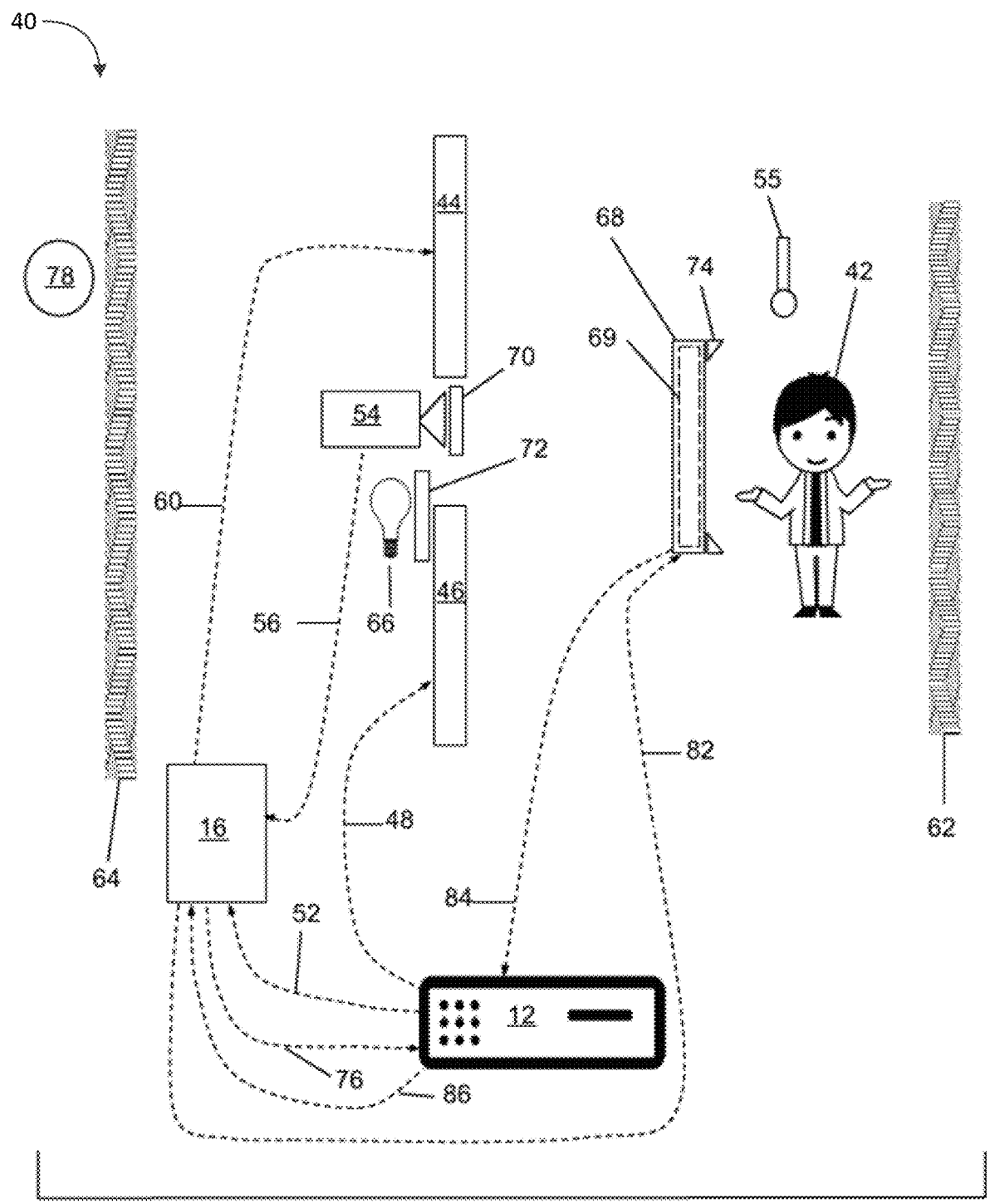
FIG. 2 is a diagram illustrating another embodiment of the system of the present disclosure.

FIG. 2 is a diagram illustrating another embodiment of the system 40 of the present disclosure. As shown in FIG. 2, the system 40 can include the hardware processor 12, the controller 16, a camera 54 having a first polarizing filter 70, a microphone 55, a light source 66 having a second polarizing filter 72, first and second displays 44 and 46 within a view of a user such as presenter 42, a transparent panel 68 having integrated light sources 74, and first and second backdrops 62 and 64.

The system 40 generates and transmits a plurality of signals including a monitor signal 48, an overlay signal 52, a camera signal 56, a presentation signal 60, a data signal 76 (e.g. a live audio and video output data signal), a projection signal 82, a touch input data signal 84, and a graphics signal 86 as described in further detail below in connection with FIG. 7. In particular, the hardware processor 12 can transmit an overlay signal 52 having at least one visual element (e.g., text or a figure) to the controller 16. The hardware processor 12 can also transmit a monitor signal 48 to the second display 46. The second display 46 can be a monitor and can allow the presenter 42 to interact with various computer applications, windows and controls displayed on the second display 46. Alternatively, the second display 46 can be a display of a computer (e.g., a laptop). The camera 54 transmits a camera signal 56 to the controller 16 that corresponds to a scene imaged by the camera 54, which can include, for example, the transparent panel 68, the presenter 42, and/or the backdrop 62. The camera signal 56 can include an audio component provided by the microphone 55 or the microphone 55 can transmit an independent audio signal to the controller 16. The camera 54 captures an image of the transparent panel 68 and the presenter 42 against the first backdrop 62. The first backdrop 62 can comprise a material having a smooth pattern or solid color. Embodiments of the first back drop 62 can be a dark color, e.g., such as black. The controller 16 can transform image data of signals and merge signals in real time to generate a presentation signal 60. For example, the controller can transform a visual element of the overlay signal 52 and overlay the transformed visual element on a signal 80 which is a left right mirrored version of camera signal 56 to generate the presentation signal 60. The presentation signal 60 can be transmitted to and displayed on the first display 44. The first display 44 can be a monitor and provides the presenter 42 with visual feedback of a presentation while presenting.

Additionally, the presenter can interact with a visual element of the presentation signal 60 displayed on the first display 44 by gesturing to the visual element or annotating the visual element via the transparent panel 68.

The presenter 42 can write and/or draw on the transparent panel 68 utilizing a writing utensil (e.g., a marker) and/or a stylus. The controller 16 left-right mirrors the camera signal 54 such that text and/or figures written in a normal orientation and legible to presenter 42 while writing on the transparent panel 68, appear to the presenter 42 in the same orientation on the first display 44. The transparent panel 68 can be comprised of a transparent material (e.g., glass or acrylic). As such, a presenter 42 can write and/or draw information (e.g., text, figures, and annotations) on the transparent panel 68 while being visible to and making eye contact with the camera 54. The integrated light sources 74 of the transparent panel 68 can be positioned on two edges of the transparent panel 68 or extend around a perimeter of the transparent panel 68 and illuminate a presenter 42 positioned behind the transparent panel 68.

It should be understood that the transparent panel 68 can include another light source or lighting system that emits light into one or more edges of the transparent material thereby causing the emitted light to travel through the transparent panel 68 via total internal reflection. As such, a presenter 42 can utilize a marker to mark a surface of the transparent panel 68 which disrupts this total internal reflection and causes light to escape from the transparent panel 68 at a location of a marking. Further, if the marker contains fluorescent dye, then a marking can glow brightly and provide an image contrast in front of the presenter 42.

Figure 8A:
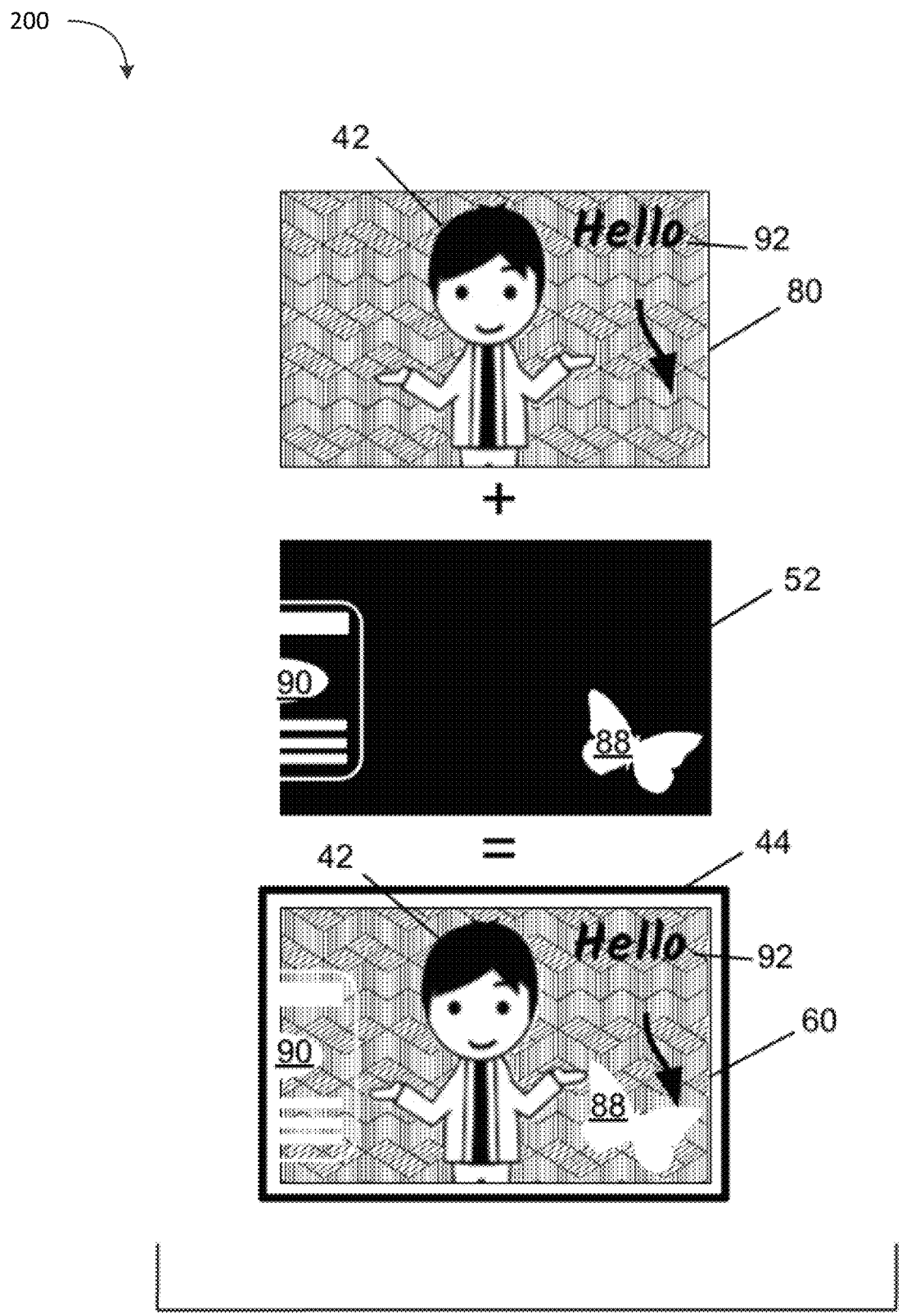
FIG. 8A is a diagram illustrating the generation of a presentation signal of the system of the present disclosure.

The presenter 42 can also utilize a touch-responsive system 69 (e.g., a touch-responsive interface) integrated into the transparent panel 68 to generate handwritten information (e.g., text, figures, or annotations). The touch responsive system 69 can be, but is not limited to, an inductive, resistive, infrared beam or gesture-based sensor system. Interactions between the presenter 42 and the touch-responsive interface are transmitted to the hardware processor 12 via a touch input data signal 84. The touch input data signal 84 can be utilized by an application (e.g., a drawing or sketching program) as a control input (e.g., a mouse or stylus) to generate a digital representation of the handwritten information. Additionally, this control input can be utilized as a multi-touch input to move and resize an application window being executed on the hardware processor 12. A digital representation of handwritten information can be edited, saved, deleted, recalled, and manipulated in various ways. A digital representation of handwritten information can also be transmitted via the overlay signal 52 for real time addition to the presentation signal 60 (as shown in FIGS. 8A-C) or can be transmitted via a graphics signal 86 which is processed similarly to the overlay signal 52 for addition to the presentation signal 60.

It should be understood that the system 40 need not include the transparent panel 68. For example, the system 40 can include an alternate touch-input device (not shown) that can display the overlay signal 52 to a presenter 42. A presenter 42 can utilize the touch-input device to draw over and annotate visual elements of the overlay signal 52 in the same way as described above in relation to a touch responsive system 69 of the transparent panel 68.

The system 40 can eliminate light source reflections during video content production without the need for additional studio space and video equipment. For example, the integrated light sources 74 of the transparent panel can illuminate a presenter 42 and obviate a need for the light source 66 which can generate reflections off of eyeglasses worn by the presenter 42 and/or the transparent panel 68. Additionally, the second backdrop 64 can eliminate reflections from one or more objects located behind the camera 54 (e.g., object 78). The second backdrop 64 can comprise a dark color material having a smooth pattern or solid color and can prevent noticeable reflections of differential contrast objects. Further, an enclosure can be constructed using the material of the first and second backdrops 62 and 64 to enclose a lens of the camera 54 up to a perimeter of the transparent panel 68 to eliminate external reflections. The enclosure simplifies a configuration and size of a studio. It should be understood that the enclosure can include the first and second displays 44 and 46. The first and second displays 44 and 46 can emit light which can generate reflections on the transparent panel 68 that are visible to the camera 54. As such, the light emitted from the first and second displays 44 and 46 can be polarized and the polarizing filter 70 of the camera 54 can remove the generated reflections.

If the transparent panel 68 is not utilized, or even when it is, light emitted by the light source 66 may still be desired to illuminate the presenter 42. Light emitted by the light source 66 can be vertically polarized by passing through the polarizing filter 72. The polarizing filter 70 is positioned in front of the camera 54 and can be oriented to block vertically polarized light to prevent reflections of the vertically polarized light from entering a lens of the camera 54. Other orientations and types of polarization can be employed.

Additionally, the system 40 can control an orientation of polarization of light emitted from multiple sources. For example, the system 40 can orient the first and second displays 44 and 46 to emit light polarized in the same direction such that reflections of the first and second displays 44 and 46 off of the transparent panel 68, the eyes or eyeglasses of the presenter 42 or other reflective surfaces can be eliminated by orienting the polarizing filter 70 of the camera 54. Alternatively, the system 40 can polarize light emitted by the light source 66 in the same direction as the first and second displays 44 and 46. The light source 66 allows for rotational adjustability of polarizing media such that the polarizing filter 70 of the camera 54 can remove the reflections of two or more sources (e.g., the light source 66 and first and second displays 44 and 46).

Figure 3:
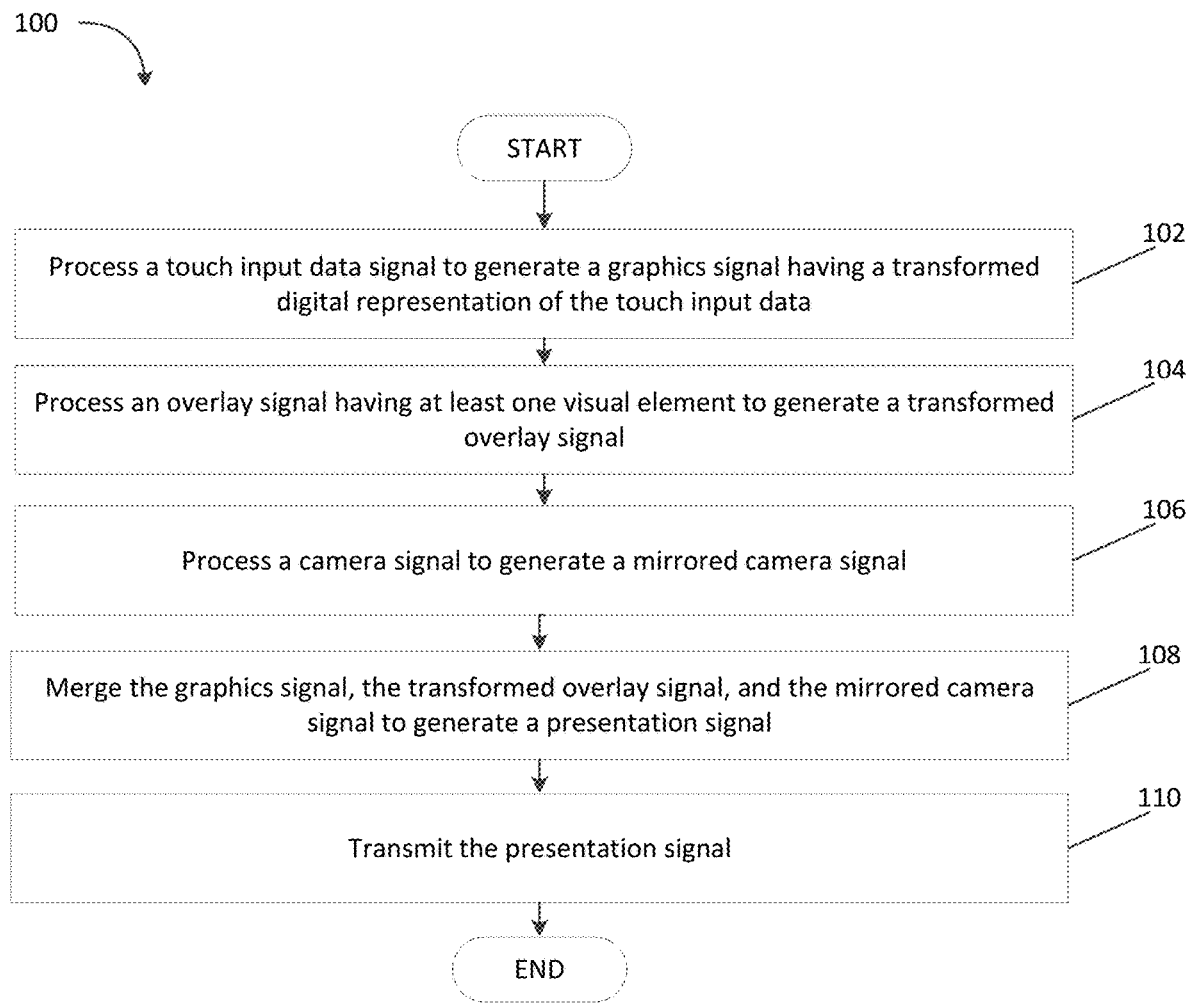
FIG. 3 is a flowchart illustrating overall example process steps carried out by the system of the present disclosure.

FIG. 3 is a flowchart 100 illustrating overall process steps carried out by the system of the present disclosure. Beginning in step 102, the system processes a touch input data signal 84 (user input data) to generate a graphics signal 86 having at least one transformed digital representation (e.g., a graphic) of the touch input data (e.g., text or a figure). The touch input data signal 84 can be based on a touch input of the presenter 42, can include an application or digital annotation, and can be partially transparent. Step 102 is discussed in greater detail in connection with FIG. 4. Then, in step 104, the system processes the overlay signal 52 to generate a transformed overlay signal. The transformed overlay signal can be partially transparent. Step 104 is discussed in greater detail in connection with FIG. 5. In step 106, the system processes a camera signal 56 to generate a mirrored camera signal (e.g., left-right mirrored). It should be understood that the system can modify a background of the mirrored camera signal. Step 106 is discussed in greater detail in connection with FIG. 6.

Then, in step 108, the system 10 merges the graphics signal 86, the transformed overlay signal, and the mirrored camera signal to generate a presentation signal 60. The graphics signal 86, the transformed overlay signal, and the mirrored camera signal can be merged via various techniques such as layering or adding color and luminance data of each signal. In step 110, the system transmits the presentation signal 60. The presentation signal 60 can be transmitted to be recorded, streamed, and/or displayed. For example, the presentation signal 60 can be output to the first display 44 and/or can be streamed or transmitted to other display devices and/or to a storage device via a communication network. It should be understood that the process 100 can include more or fewer steps and/or that one or more of steps 102, 104, and 106 can be omitted and that these steps need not be executed sequentially in the order as shown in FIG. 3 but may be executed sequentially in a different order or in parallel.

Figure 4:
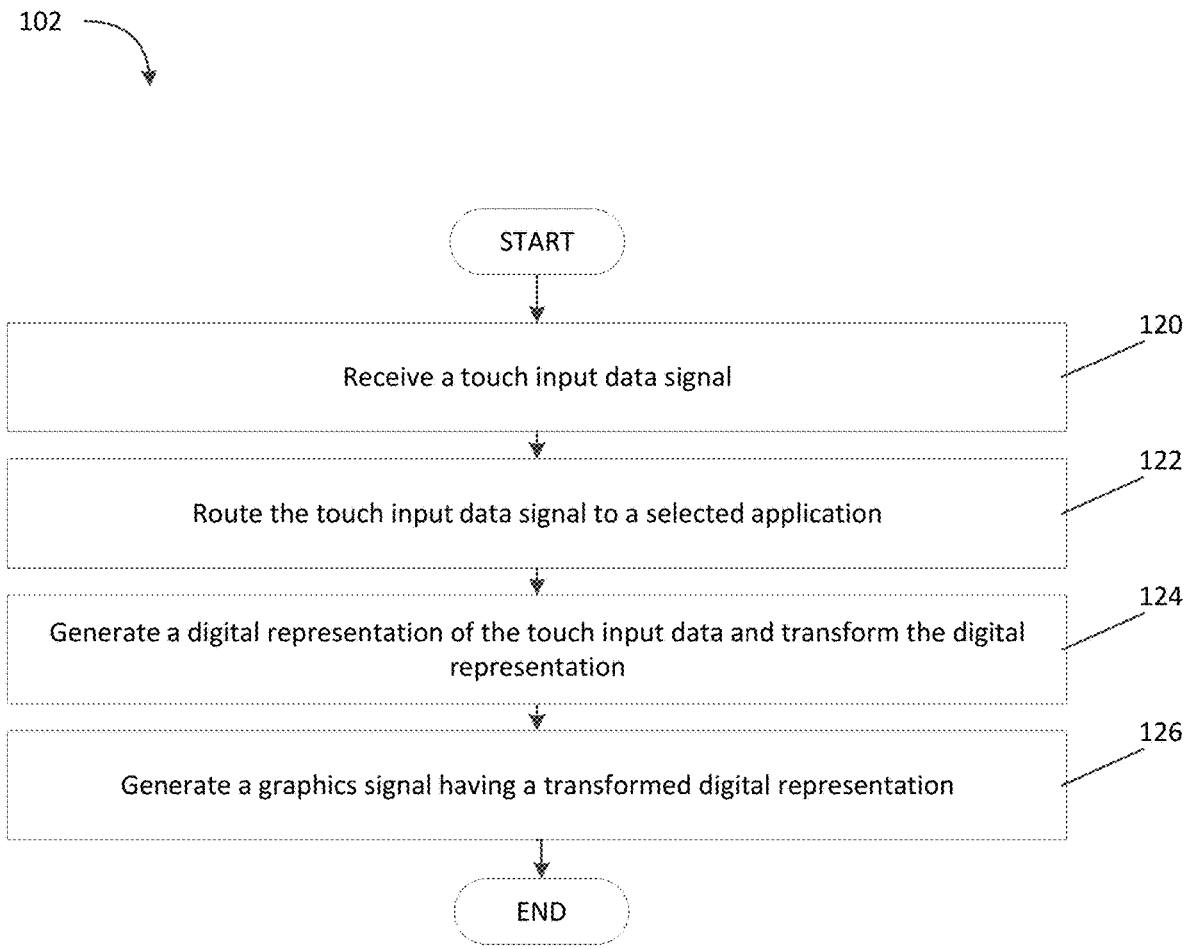
FIG. 4 is a flowchart illustrating step 102 of FIG. 3 in greater detail.

FIG. 4 is a flowchart illustrating step 102 of FIG. 3 in greater detail. In step 120, the system receives a touch input data signal 84. Then, in step 122, the system routes the touch input data signal 84 to a control or drawing application for processing. In step 124, the control or drawing application generates a digital representation of the touch input data (e.g., text or a drawn figure) and that digital representation is transformed. For example, the control application can move, resize, or otherwise interact with the touch input data. In another example, one or more data components (e.g., a background color, a control menu, a color palette) of the drawing application can be modified or removed, such as being made transparent. The removal process can utilize a chrominance or luminance keying function or a shape key to omit an element based on a location thereof. In step 126, the system generates a graphics signal 86 having a transformed digital representation (e.g., text or a figure).

Figure 5:
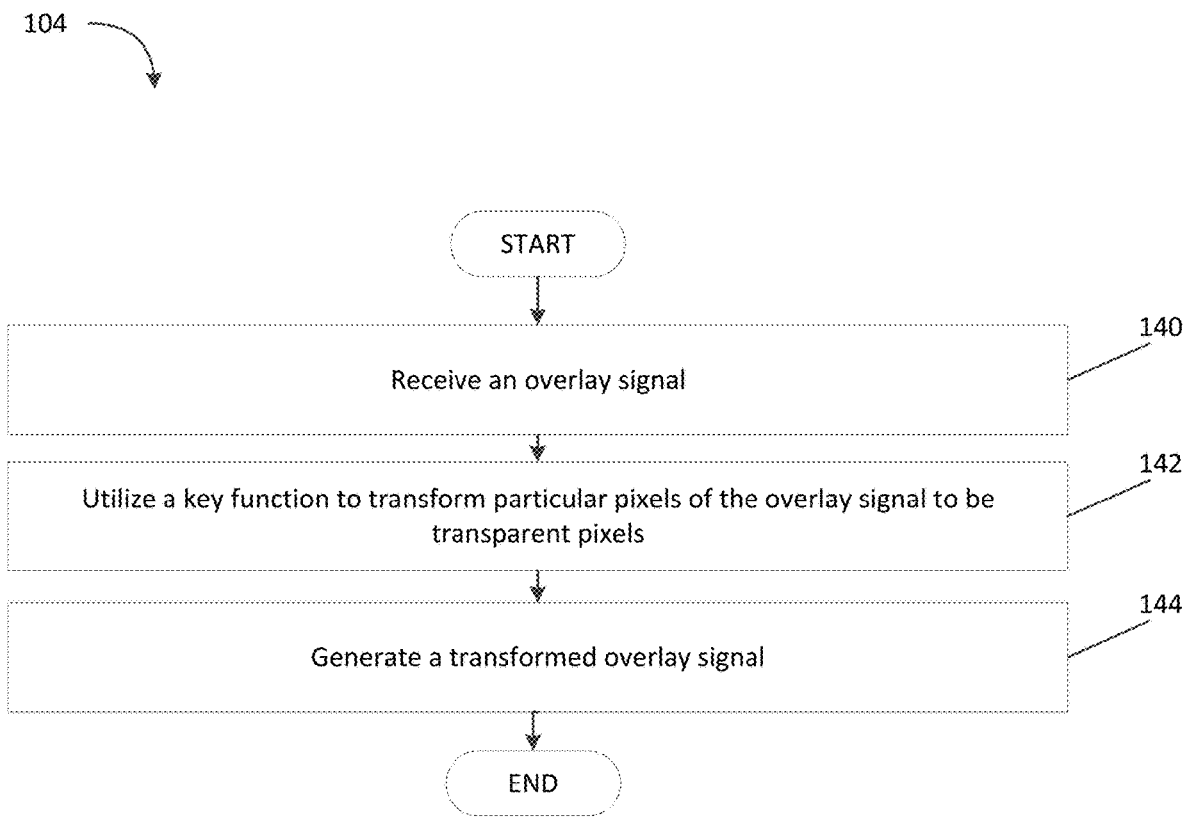
FIG. 5 is a flowchart illustrating step 104 of FIG. 3 in greater detail.

FIG. 5 is a flowchart illustrating step 104 of FIG. 3 in greater detail. In step 140, the system receives an overlay signal 52. The overlay signal 52 can include one or more visual elements (e.g., text, a logo, an application window, a presentation slide, a drawing, a figure, a diagram, a chart, and a graph) as an overlay and the one or more visual elements can be digitally added to a presentation signal 60, which can then be recorded, streamed, and/or displayed. For example, the presentation signal 60 can be output to the first display 44 for display on the first display 44 and/or can be streamed or transmitted to other display devices or storage devices via a communication network. In step 142, the system utilizes a luminance key function to transform particular pixels (e.g., black pixels) of the overlay signal 52 to be transparent. It should be understood that alternative key functions could be utilized such as a chrominance key or a shape key. In step 144, the system 10 generates a transformed overlay signal including the one or more visual elements.

Figure 6:
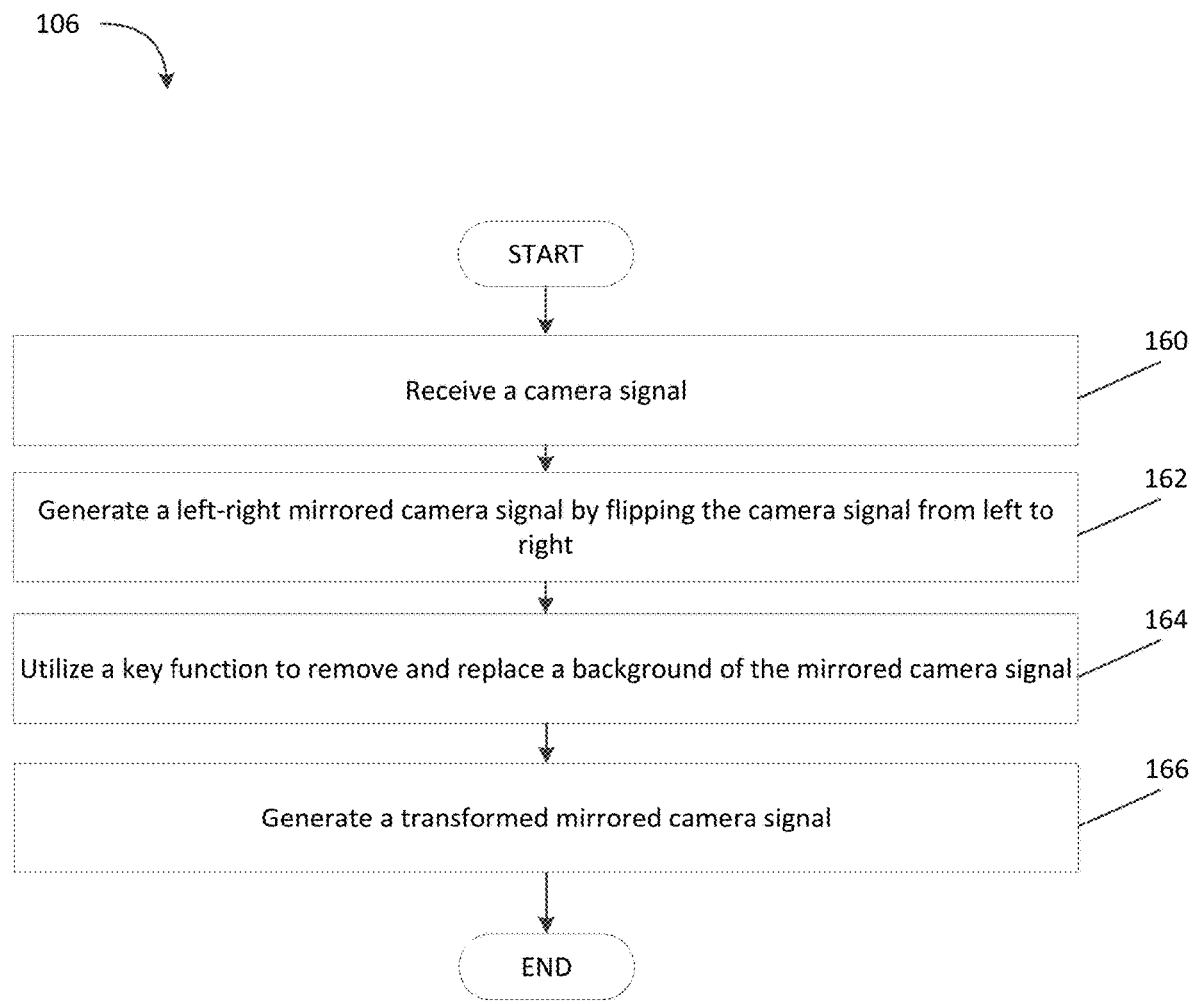
FIG. 6 is a flowchart illustrating step 106 of FIG. 3 in greater detail.

FIG. 6 is a flowchart illustrating step 106 of FIG. 3 in greater detail. In step 160, the system receives a camera signal 56 corresponding to the scene imaged by the camera 54. In step 162, the system generates a mirrored camera signal by flipping image data of the camera signal from left to right. Then, in step 164, the system 10 utilizes a key function to remove and replace a background of the mirrored camera signal. The key function can be one of a chrominance key, a luminance key or a shape-based key to remove a specific background color or a specific section of a camera-captured image. A replacement background can be added to the background of the remaining image. In step 166, the system generates a transformed mirrored camera signal.

Figure 7:
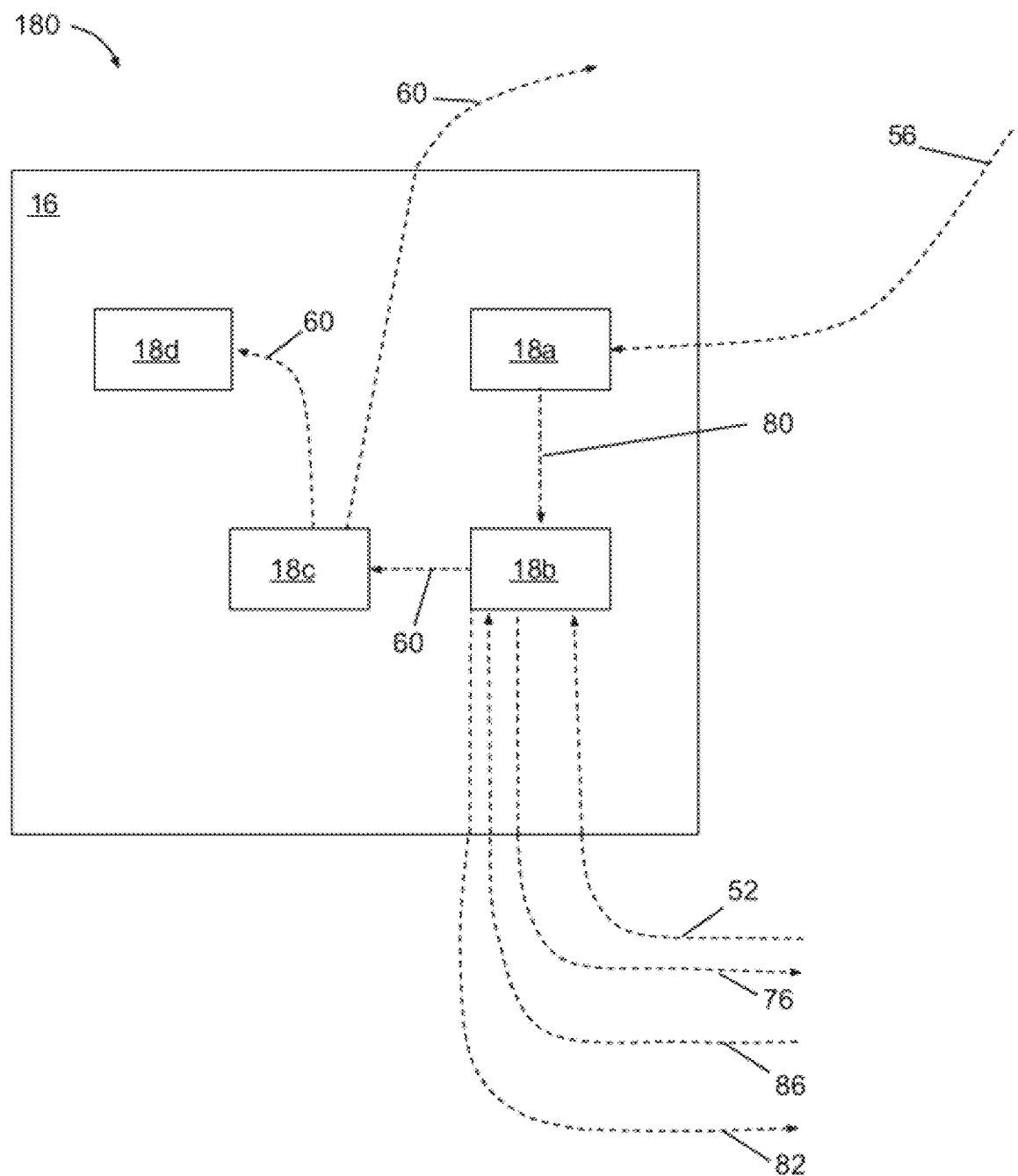
FIG. 7 is a diagram illustrating a controller of the system illustrated in FIG. 1.

FIG. 7 is a diagram 180 illustrating the controller 16 of FIG. 1. The controller 16 can be a video controller and can include a mirroring device 18*a*, a video switcher 18*b*, a signal duplicator 18*c*, and a recording module 18*d*. The controller 16 can receive, generate and transmit signals including the overlay signal 52, the camera signal 56, the presentation signal 60, the data signal 76, the mirrored camera signal 80, the projection signal 82, the touch input data signal 84, and the graphics signal 86 as described in further detail below. The mirroring device 18a receives the camera signal 56 and mirrors the camera signal 56 horizontally (e.g., left to right) to generate a mirrored camera signal 80. The mirroring device 18a transmits the mirrored camera signal 80 to the video switcher 18b. It should be understood that the mirroring device 18a can be obviated by utilizing a mirror in front of the camera 54 such that the camera 54 is rotated 90 degrees from a viewing axis and the mirror is placed 45 degrees from an optical axis of the camera 54.

Figure 10B:
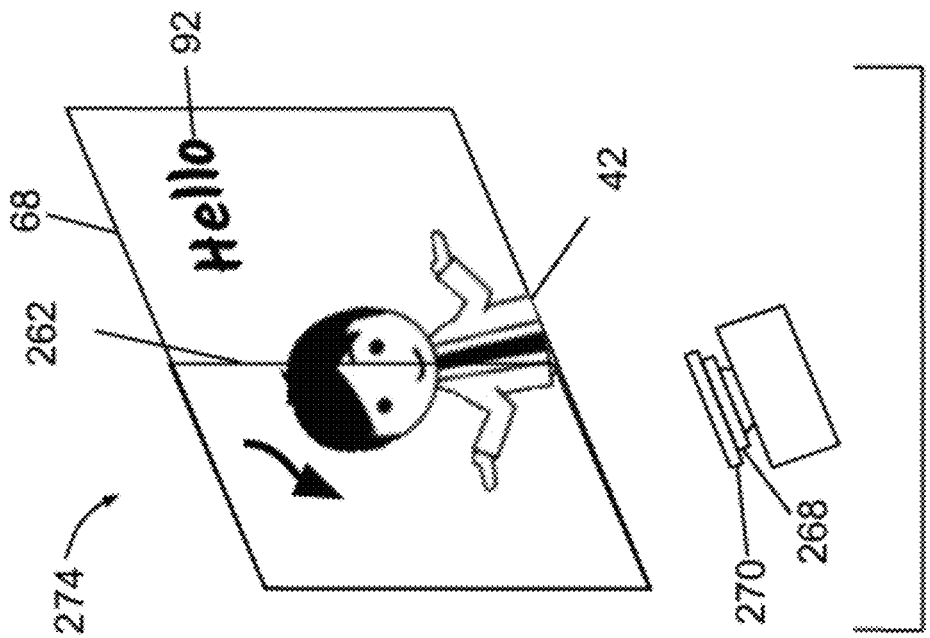
FIGS. 10A-B are diagrams illustrating a presentation arrangement of an embodiment of the system of the present disclosure.
Figure 10A:
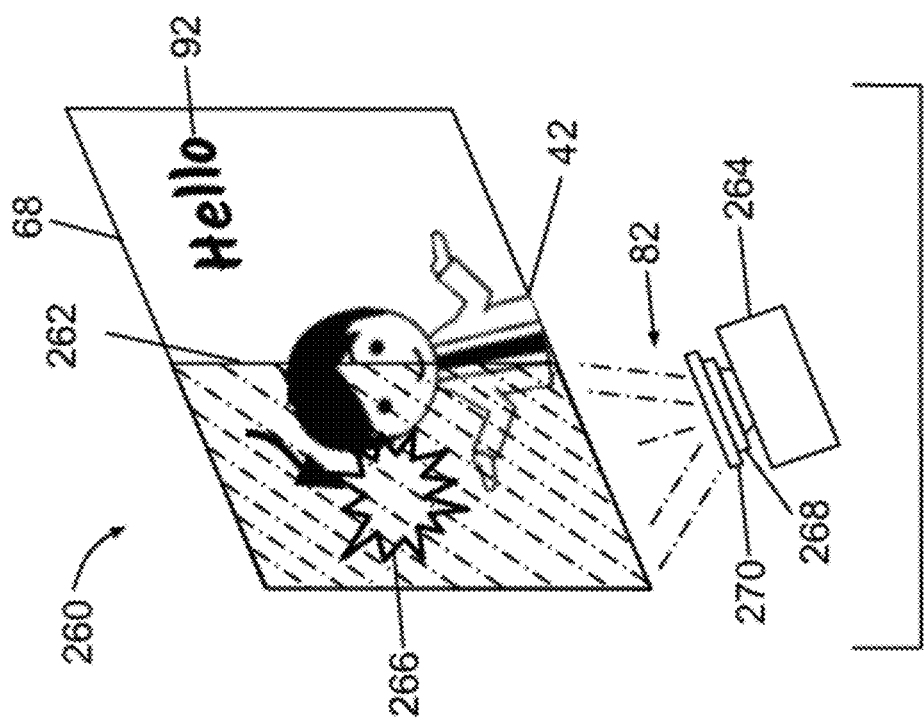

The video switcher 18b receives and transforms the overlay signal 52, the mirrored camera signal 80, and the graphics signal 86 and generates and transmits the presentation signal 60 and the projection signal 82. In particular, the video switcher 18b transmits the presentation signal 60 to the signal duplicator 18c and the projection signal 82 to a projector 264 (as shown in FIGS. 10A-B) to be projected onto the transparent panel 68.

As described in further detail below in connection with FIGS. 10A-B, the projection signal 82 and visual information (e.g., a visual element) thereof can be projected onto the transparent panel 68 such that the visual information can be visible or not visible by the camera 54 (e.g., the camera signal 56). The visual information can include, but is not limited to, text (e.g., notes), a cue (e.g., a presentation transition), and a traceable element (e.g., a figure stencil). For example, a presenter 42 can utilize notes or cues that are not captured by the camera 54 (e.g., not included in the camera signal 56) and are not visible to a presentation viewer, to control and guide a presentation. In another example, a presenter 42 can utilize a figure stencil projected onto the transparent panel 68 to draw the figure based on the projected figure stencil. Additionally, a presenter 42 can utilize a shape projected onto the transparent panel 68 to effectively annotate the shape which can be included in overlay signal 52. As such, the projection signal 82 can be utilized as a guidance tool by the presenter 42 to efficiently and naturally reference and/or annotate visual information and draw figures on the transparent panel 68 compared to referencing the visual information as displayed on the first display 44 via the presentation signal 60. Therefore, rather than relying on the presentation signal 60 displayed on the first display 44 for spatial awareness and/or on unguided movements, the projection signal 82 provides for building presenter 42 confidence and improving overall spatial awareness and use of the transparent panel 68. It should be understood that the projection signal 82 can be simply a duplicate of the overlay signal 52 or can be based on a combination of signal 52, a processed output of the graphics signal 86, and additional visual elements, all after treatments such as luminance, chrominance, or shape keying are applied as discussed previously The signal duplicator 18c duplicates the presentation signal 60 into identical signals which are respectively transmitted to the first display 44 and the recording module 18d. The presentation signal 60 is displayed on the first display 44 and can be viewed by a presenter 42 while presenting. The recording module 18d records the presentation signal 60 to storage media (e.g., removable storage media or database server 22).

The controller 16 can include a source to receive and add audio input signals from an audio source (e.g., microphone 55) to the presentation signal 60. It should be understood that the hardware processor 12 can comprise the controller 16 and the elements and features thereof into a single unit with a single power cord for efficient deployment and use. Additionally, components of the system 40 (e.g., the camera 54, the microphone 55, the light source 66, the first and second displays 44 and 46, and the transparent panel 68 having the integrated light sources 74) can be configured to power on to a ready-to-record state via a single power on and power off control action by the presenter 42. For example, the hardware processor 12 or controller 16 can include a single button to initiate and stop recording. As such, a presenter 42 can record video content incorporating a variety of visual elements without interacting with the controls of the components of the system 40 (e.g., the camera 54). The controller 16 can also include a live audio and video output data signal 76 which can be utilized by the hardware processor 12 or transmitted to a separate computer for live streaming to one or more external streaming or recording services. A streaming or recording service can be in communication with the hardware processor 12 via a local area network, wireless transfer, or internet protocols.

FIG. 8A is a diagram 200 illustrating the generation of a presentation signal 60. As shown in FIG. 8A, the mirrored camera signal 80 is merged with visual elements (e.g., butterfly 88 and application window 90) of the overlay signal 52 to generate the presentation signal 60 displayed on the first display 44. In particular, the overlay signal 52 is transformed by removing the black background thereof such that the butterfly 88 and application window 90 are isolated and can be overlaid in a foreground of the mirrored camera signal 80.

FIGS. 8B-C are diagrams illustrating an example application of the system of the present disclosure. In particular, FIGS. 8B and 8C are diagrams 210 and 215 illustrating the translation (e.g., using a click-and-drag function) of an application window 90 of a monitor signal 48 displayed on a second display 46 to a presentation signal 60 displayed on a first display 44. FIG. 8B illustrates the monitor signal 48 and the presentation signal 60 in a left-right arrangement as seen by a presenter 42 when presenting. As mentioned above, the second display 46 can be a monitor and can be utilized to display one or more applications containing notes (e.g., application window 90), a live application (e.g., a video conferencing application), etc. The first display 44 can also be a monitor and can be utilized as a confidence monitor by the presenter 42 to view the presentation signal 60. The presentation signal 60 can include one or more visual elements as viewed by the camera 54 such as the presenter 42 and written information 92 and one or more additional visual elements (e.g., butterfly 88) from an overlay source (e.g., overlay signal 52).

FIG. 8C illustrates the monitor signal 48 and the presentation signal 60 in a left-right arrangement as seen by a presenter 42 and the partial translation of the application window 90 of the monitor signal 48 displayed on the second display 46 to the presentation signal 60 displayed on the first display 44. As shown in FIG. 8C, the application window 90 is transformed and dragged and dropped in real time during the translation process. In particular, a dark background of the application window 90 is removed and made transparent prior to being dragged and dropped onto the presentation signal 60.

Figure 9:
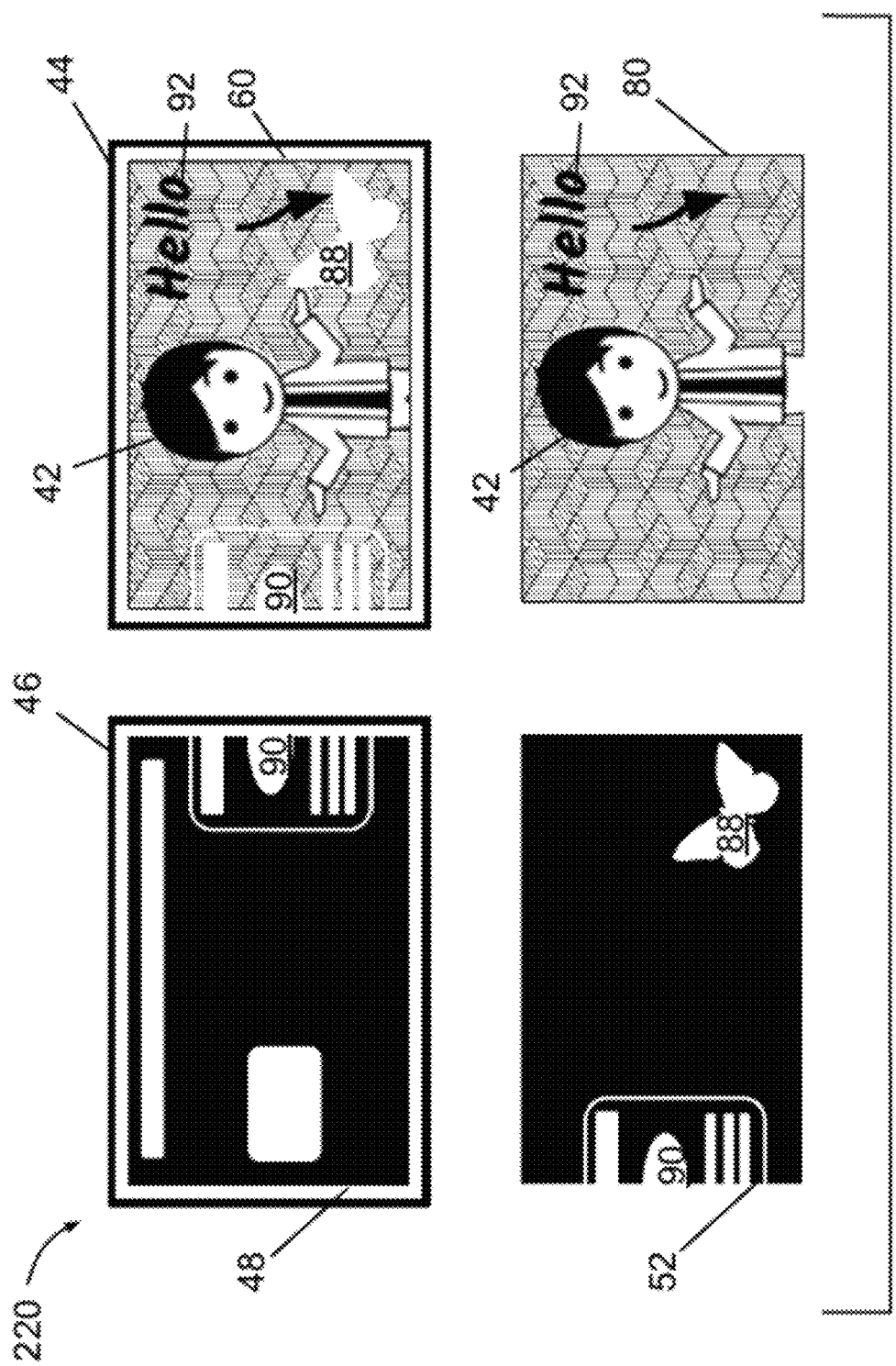
FIG. 9 is a diagram illustrating a relationship between a set of signals of the system of the present disclosure.

FIG. 9 is a diagram 220 illustrating a relationship between a set of signals of the system of the present disclosure. In particular, FIG. 9 illustrates a monitor signal 48, an overlay signal 52, a presentation signal 60, and a mirrored camera signal 80. The monitor signal 48 is displayed on a second display 46 and the presentation signal 60 is displayed on a first display 44. As shown in FIG. 9, the system can generate the presentation signal 60 by transforming and merging the visual elements (e.g., butterfly 88 and application window 90) of the overlay signal 52 with the mirrored camera signal 80.

The hardware processor 12 can consider each of the monitor signal 48 and the overlay signal 52 as an external monitor type signal. Additionally, the hardware processor 12 can configure a display arrangement of the signals 48 and 52 such that the monitor signal 48 is positioned on the left of a left-right monitor arrangement and the overlay signal 52 is positioned on the right of the left-right monitor arrangement. It should be understood that other display arrangements (e.g., a vertically stacked top-bottom array) can be configured and that the display arrangement configuration is indicative of a physical arrangement of the first and second displays 44 and 46 as viewed by a presenter 42. The hardware processor 12 can also configure a background of the overlay signal 52 to be a specific color (e.g., black) to facilitate desired image processing via luminance and chrominance keying operations. For example, the hardware processor 12 can utilize a luminance key function to transform each black visual element of an overlay signal 52 to be transparent and overlay the remaining visual elements on top of the mirrored camera signal 80 to generate the presentation signal 60. Additionally, the hardware processor 12 can set a default image having a visual element (e.g., grid lines or a logo) as the background of the overlay signal 52. In this way, the grid lines or logo can be a default addition of the overlay signal 52 when not superseded by another image or application positioned in front of the grid lines or logo.

As mentioned above, a presenter 42 can write text and/or draw figures on the transparent panel 68. The presenter 42 can also interact with the hardware processor 12 while the first and second displays 44 and 46 are within view of the presenter 42. For example, during a presentation, a presenter 42 can interact with various applications, files, and functions as shown on the second display 46 but not visible in the mirrored camera signal 60 as shown on the first display 44.

Further, a presenter 42 can instantaneously relocate (e.g., using a click-and-drag function) an application or file window from the second display 46 to the first display 44, with previously described transformations upon the application or file window occurring instantaneously. As such, the system provides for an application image to be merged with a live (e.g., low latency) camera image via a seamless, efficient and presenter friendly control method. Additionally, the system allows a presenter 42 to utilize the first display 44 for visual feedback because the presentation signal 60 as displayed on the first display 44 includes a real time view of the camera 54 (e.g., mirrored camera signal 80) and visual elements (e.g., butterfly 88 and application window 90) of the overlay signal 52 added thereto. For example, a presenter 42 can utilize the first display 44 for feedback to gesture towards and/or effectively annotate using the transparent panel 68 as if the contents of the presentation signal 60 (e.g., butterfly 88 and application window 90) are displayed on the transparent panel 68. Additionally, it should be understood that the presentation signal 60 is indicative of studio produced video content in real time and, as such, the presenter 42 can utilize the first display 44 as a reference to determine whether the content, quality and appearance of the video content (e.g., presentation) is acceptable.

FIG. 10A is diagram 260 illustrating a presentation arrangement of an embodiment of the system of the present disclosure. In particular, FIG. 10A illustrates a first state of a controllable opacity sheet 262 fixed to a surface of or integrally formed with the transparent panel 68 and a projector 264 configured to receive a projection signal 82 and project an image thereof onto the sheet 262.

The sheet 262 has a controllable opacity. In particular, a presenter 42 can control the opacity of the sheet 262 and can view and interact with the projected image including a visual element 266 thereof. The sheet 262 can be fixed to a portion of the surface of the transparent panel 68 (as shown in FIGS. 10A and 10B) or an entirety of the surface of the transparent panel 68. The projector 264 includes a polarizing filter 268 and a shutter 270. The projector receives a projection signal 82 and projects an image thereof onto the sheet 262. The shutter 270 can be controlled to open and close to omit a projected image of the projection signal 82 for predetermined periods of time. The opening and closing of the shutter 270 can be synchronized with an integral or external shutter of the camera 54. The shutter 270 can be mechanical or can be comprised of a material of controllable opacity (e.g., an LCD) or may be integral to the projector.

As mentioned above, the first and second displays 44 and 46 can emit light which can generate reflections on the transparent panel 68 that are visible to the camera 54. As such, the light emitted from the first and second displays 44 and 46 can be polarized and a polarizing filter 70 of the camera 54 can remove the generated reflections. Additionally, the polarizing filter 70 of the camera 54 and the polarizing filter 268 of the projector 264 can be each oriented such that light polarized by the filter 268 does not pass through the polarizing filter 70. This coordinated management of polarization provides for the projected image of the projection signal 82 to be visible to the presenter 42 while simultaneously not being visible by the camera 54 (e.g., projection signal 82 is omitted from the image of the camera 54).

As shown in FIG. 10A, in the first state, the sheet 262 can be controlled/driven into a state of increased opacity for a predetermined period. In particular, an opacity of the sheet 262 can be fixed in a semi-opaque state for a duration of a presentation with one or more images of the projection signal 82 projected onto the sheet 262. The camera 54 can record the one or more projected images, the presenter 42 and written information (e.g., text 92 and/or drawings) made on the transparent panel 68 by the presenter 42. The written information is partially visible through and fully visible around the semi-opaque sheet 262.

It should be understood that a digital overlay of projection signal 82 or overlay signal 52 can be added to a presentation signal 60 to provide for greater visibility of the components with high fidelity. It should also be understood that the projection signal 82 can be projected directly onto the transparent panel 68 without a controllable opacity sheet 262 affixed thereto. A presenter 42 can determine an opacity of the transparent panel 68 to provide a desired balance of clarity in the camera-collected image of the presenter 42 and the vibrancy of the projected image. Particles can also be fixed on a surface of the transparent panel 68 or within the transparent panel 68. These particles provide for an image projected onto a transparent panel 68 surface proximate to the presenter 42 to be visible to the presenter 42 without being visible to the camera 54. Light projected on these particles can be cyclically pulsed relative to a phase of a shutter of the camera 54.

FIG. 10B is diagram 280 illustrating a presentation arrangement of an embodiment of the system of the present disclosure. In particular, FIG. 10B illustrates a second state of the sheet 262 fixed to the surface of the transparent panel 68 and the projector 264 configured to receive the projection signal 82 and project an image thereof onto the sheet 262. As shown in FIG. 10B, after a predetermined period, the sheet 262 can return to a state of decreased opacity and the projector 264 ceases to project light. During the second state, the camera 54 captures one image or frame of a video. Subsequently, the sheet 262 and projector 264 revert to the first state as shown in FIG. 10A. This process can repeat indefinitely. Cycling between the first and second states provides for the capture of high quality video without the presence of projected images while allowing a presenter 42 to view reference information for visual guidance (e.g., where to gesture and write). Additionally, cycling between the first and second states can be executed at a high frequency such that any flicker is imperceptible to the presenter 42. A global timecode can be utilized to synchronize the equipment required to maintain a proper timing of these mutually exclusive states.

It should be understood that the controller 16 can execute signal processing to allow a portion of visual elements of the overlay signal 52 to be included in the projection signal 82 while also excluding those visual elements from the presentation signal 60. For example, the controller 16 can provide for tracing guides or notes to be included in the overlay signal 52 and visible to the presenter 42 while excluding the tracing guides or notes from the presentation signal 60 such that the tracing guides or notes are not visible to a viewer of the presentation. This type of signal processing can utilize transformations based on particular chrominance or luminance values of pixels of the overlay signal 52. In particular, the controller 16 can assign a particular color to a visual element that a presenter 42 wishes to be visible on the transparent panel 68 but not visible in the presentation signal 60 (e.g., the controller 16 removes the particular color before merging the overlay signal 52 with the presentation signal 60). Alternatively, the projection signal 82 projected onto the transparent panel 68 could be entirely different from the overlay signal 52.

As described in further detail below in connection with FIGS. 11 and 12, the transparent panel 68 can comprise a transparent or translucent liquid crystal display (LCD) or an organic light-emitting diode (OLED) display having lighted pixels to display information in a direction of a presenter 42. The projection signal 82 can be displayed using these lighted pixels and the lighted pixels can provide light in the direction of the presenter 42 that is not visible to the camera 54 (e.g., the camera does not capture the image). A high-fidelity version of overlay signal 52, transformed to remove or alter a particular visual element thereof, can be integrated into the presentation signal 60. Alternatively, the transparent panel 68 can include lighted pixels to provide light in a direction away from the presenter 42 that is visible to the camera 54 and to an in-person viewer. These lighted pixels may or may not be separate and separately controlled from the lighted pixels proximately facing a presenter 42.

Figure 11:
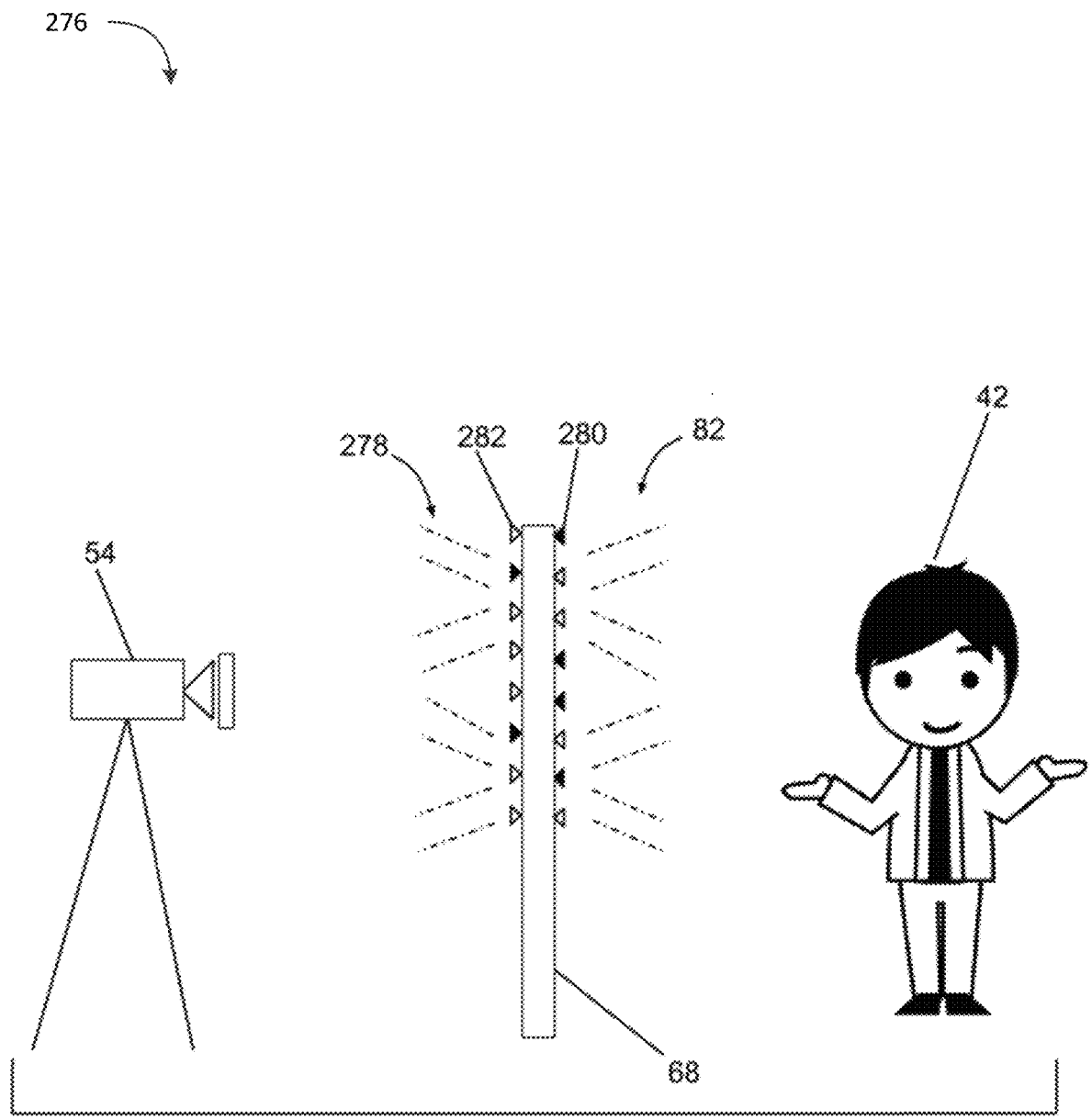
FIG. 11 is a diagram illustrating an example transparent panel of the system of the present disclosure.

FIG. 11 is a diagram 276 illustrating an example transparent panel 68 of the system of the present disclosure. As shown in FIG. 11, the transparent panel 68 includes a plurality of lighted pixels 280 and a plurality of lighted pixels 282. The plurality of lighted pixels 280 is oriented to face the presenter 42 and project light in a direction of the presenter 42. As such, the plurality of pixels 280 do not project light in a direction of the camera 54. The plurality of the lighted pixels 280 can be illuminated to display an image of the projection signal 82 to the presenter 42 thereby allowing the presenter 42 to reference or interact with the image. The plurality of lighted pixels 282 is oriented to face the camera 54 and project light in a direction of the camera 54. As such, the plurality of lighted pixels 282 do not project light in a direction of the presenter 42. The plurality of lighted pixels 282 can be illuminated to display an image of signal 278 which can be imaged by the camera 54 or, alternatively, viewed by a viewer from a side of the transparent panel 68 opposite from the presenter 42. The projection signal 82 and the signal 278 can be different from one another. For example, projection signal 82 can include and provide tracing guidelines to the presenter 42 which are not included in the signal 278. The projection signal 82 can also include visual elements (e.g., butterfly 88 and application window 90 as shown in FIGS. 8A-C and FIG. 9) which can also be included in the signal 278. Each of the projection signal 82 and the signal 278 can include a digital representation of touch input data (e.g., text or a drawn figure) generated from an interaction of the presenter 42 with the transparent panel 68 via a stylus or touch interface. Alternatively, the projection signal 82 and the signal 278 can be identical signals. The signal 278 can also be a left-right mirrored version of the projection signal 82 such that a gesture of the presenter 42 towards an image of the projection signal 82 is viewed by the camera 54 as a gesture to the same image. It should be understood that the transparent panel 68 is transparent, despite the inclusion of the pluralities of pixels 280 and 282 therein, such that the camera 54 can image a scene including the presenter 42. A size of each pixel of the pluralities of pixels 280 and 282 as shown in FIG. 11 is not intended to be to scale thereby providing for substantial interstitial space between the pluralities of pixels 280 and 282 and rendering the panel 68 transparent.

Figure 12:
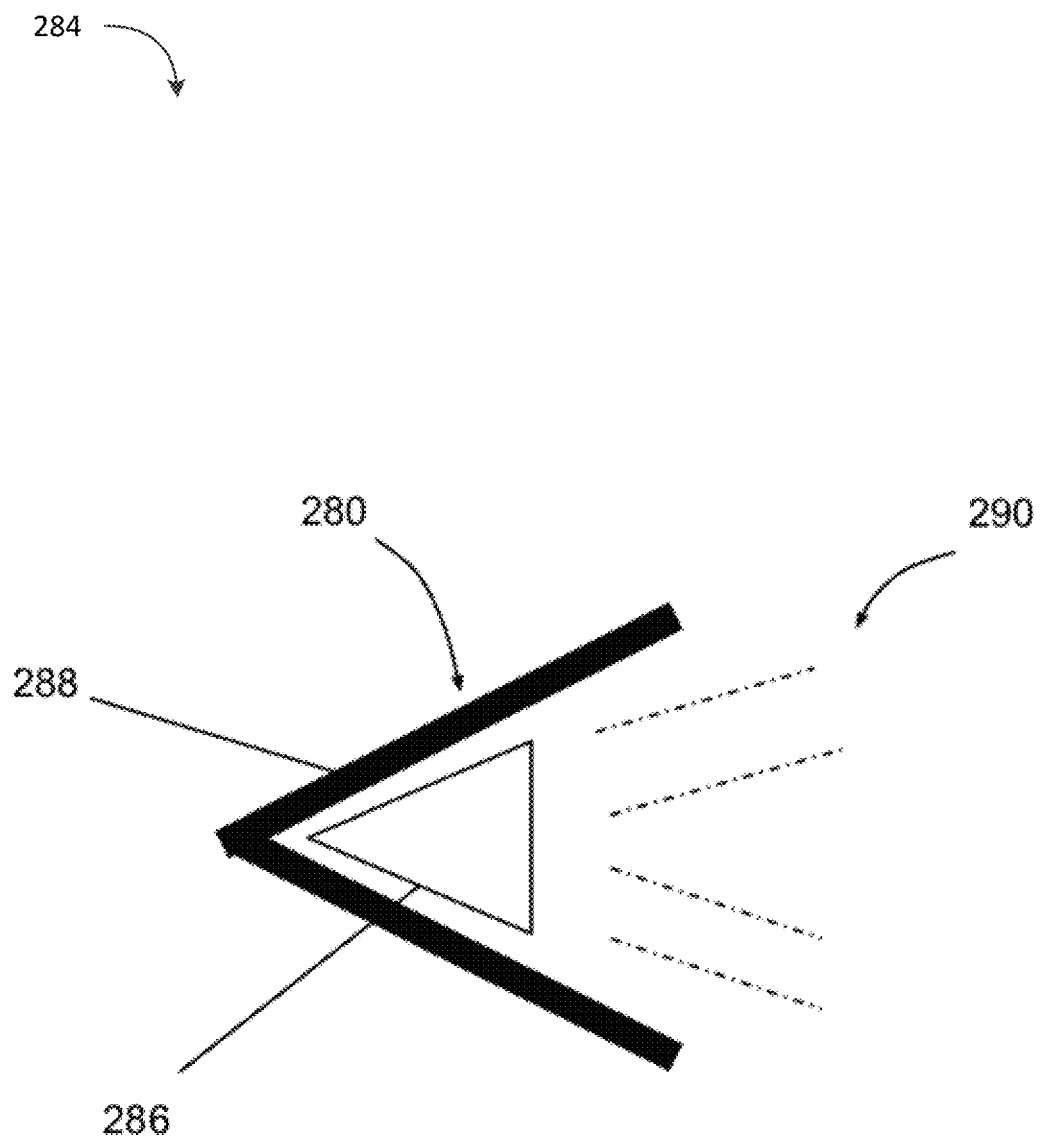
FIG. 12 is a diagram illustrating a lighted pixel of the transparent panel of FIG. 11.

FIG. 12 is a diagram 284 illustrating a lighted pixel 280 of the transparent panel 68 of FIG. 11. The lighted pixel 280 includes a light emitting element 286 and an opaque shroud 288. The light emitting element 286 can be a light-emitting diode (LED), an organic light-emitting diode (OLED) or any suitable light emitting element. The light emitting element 286 emits light 290 in a controlled geometric range such that the emitted light 290 is visible to a presenter 42 but not visible to a camera 54. The opaque shroud 288 surrounds the light emitting element 286 to limit a direction from which the emitted light 290 can be visible. It should be understood that each lighted pixel 280 can be configured to emit light equally in a direction of a presenter 42 and a camera 54.

Figure 13:
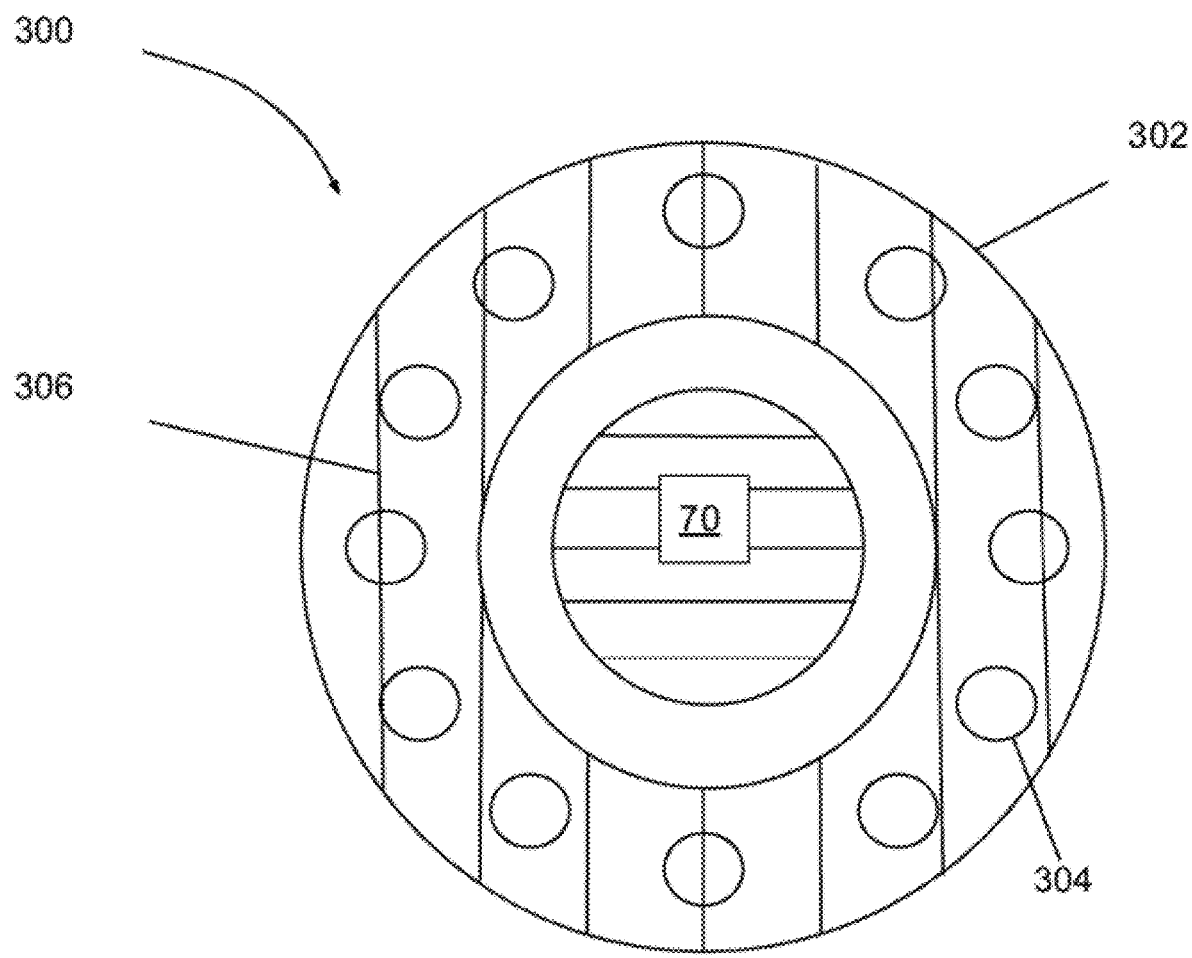
FIG. 13 is a diagram illustrating a light source of an embodiment of the system of the present disclosure.

FIG. 13 is a diagram 300 illustrating a light source 302 of an embodiment of the system of the present disclosure. The light source 302 includes a plurality of light emitting elements 304 and can be shaped like a ring. The light emitting elements 304 can be light-emitting diodes (LEDs) or any suitable light emitting elements. The light source 302 can be positioned concentric about a lens of the camera 54 and can have an opening sufficiently sized so as not to obstruct a field of view of the camera 54. A donut shaped polarizing filter 306 can be positioned in front of the light source 302 and can be freely rotated about the light source 302 to yield a desired orientation relative to the polarizing filter 70 positioned in front of the camera 54. For example, if filters 70 and 306 are linearly polarized, then the polarizing filter 306 can be oriented with polarization perpendicular to the polarization of the polarizing filter 70. When the polarizing filters 70 and 306 are appropriately oriented, reflections of emitted light can be removed from a camera captured image.

Figure 14:
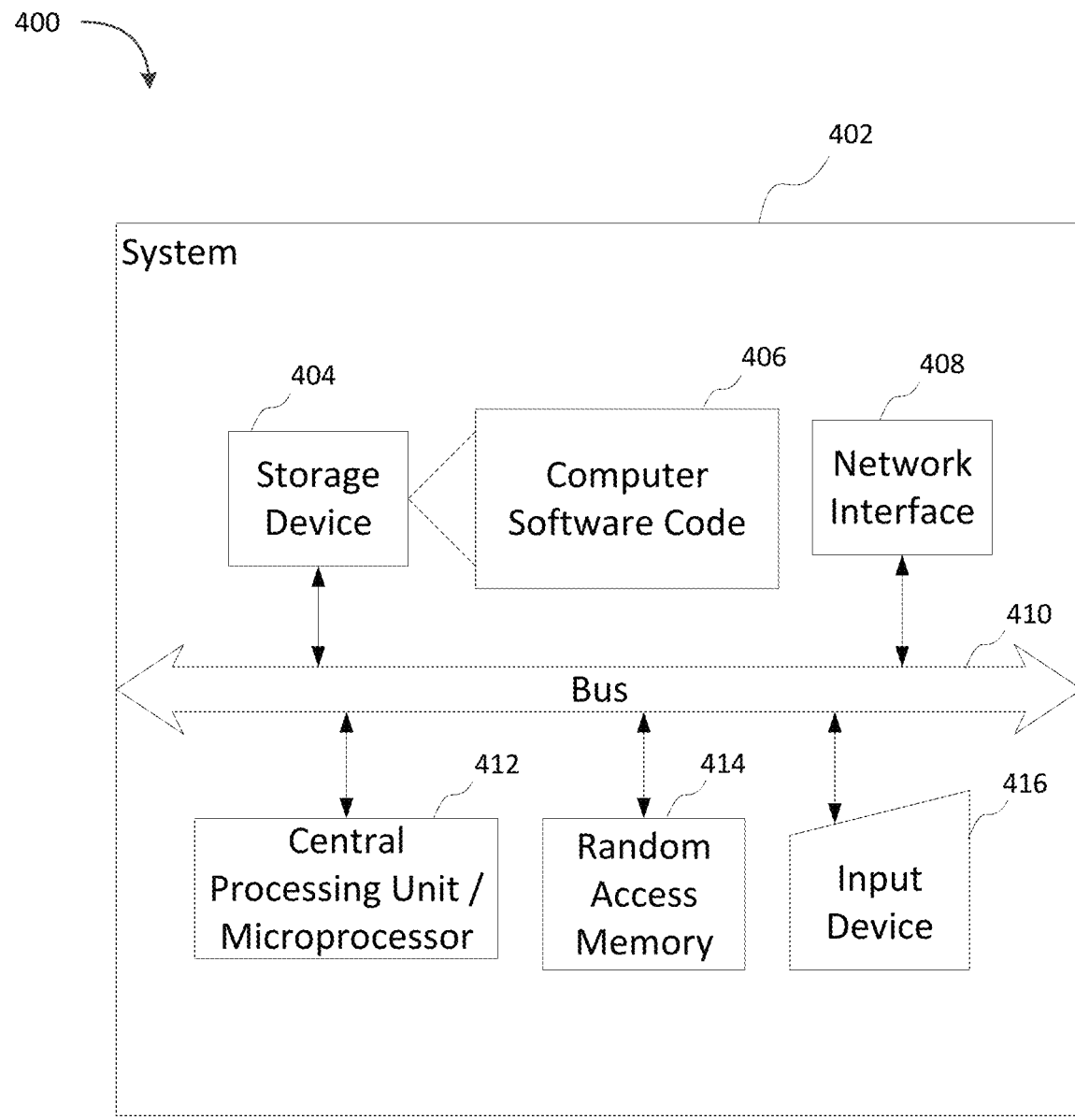
FIG. 14 is a diagram illustrating hardware and software components capable of being utilized to implement the system of the present disclosure.

FIG. 14 is a diagram 400 illustrating hardware and software components of a computer system 402 on which the system code 14 of the present disclosure can be implemented. The computer system 402 can include a storage device 404, computer software code 406 (e.g., system code 14), a network interface 408, a communications bus 410, a central processing unit (CPU) or microprocessor 412, a random access memory (RAM) 414, and one or more input devices 416, such as a keyboard, mouse, etc. It is noted that the CPU 412 could also be one or more graphics processing units (GPUs). The computer system 402 could also include a display (e.g., an LCD, a cathode ray tube (CRT), etc.). The storage device 404 could comprise any suitable, computer-readable storage medium such as a disk, non-volatile memory (e.g., read-only memory (ROM), erasable programmable ROM (EPROM), electrically-erasable programmable ROM (EEPROM), flash memory, FPGA, etc.). The computer system 402 could be a networked computer system, a personal computer, a server, a smart phone, a tablet computer, etc. It is noted that the server need not be a networked server, and indeed, could be a stand-alone computer system.

The functionality provided by the present disclosure could be provided by computer software code 406, which could be embodied as computer-readable program code stored on the storage device 404 and executed by the CPU 412 using any suitable, high or low level computing language and/or executable files, such as Python, Java, C, C++, C #, etc. The network interface 408 could include an Ethernet network interface device, a wireless network interface device, or any other suitable device which permits the computer system 402 to communicate via a network. The CPU 412 could include any suitable single-core or multiple-core microprocessor of any suitable architecture that is capable of implementing and running the computer software code 406. The RAM 414 could be any suitable, high-speed, RAM typical of most modern computers, such as dynamic RAM (DRAM).

Having thus described the system and method in detail, it is to be understood that the foregoing description is not intended to limit the spirit or scope thereof. It should be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the appended claims.

What is claimed is:

1. A system for production and presentation of video content comprising:
   a transparent panel;
   a camera positioned adjacent to the transparent panel, the camera generating a camera signal indicative of image data of a user positioned on a side of the transparent panel opposing the camera;
   a memory storing one or more instructions; and
   a processor configured to or programmed to read the one or more instructions stored in the memory, the processor configured to or programmed to:
      receive the camera signal;
      receive an overlay signal having at least one visual element;
      display the at least one visual element of the overlay signal on the transparent panel; and
      control a display of the at least one visual element on a plurality of lighted pixels of the transparent panel such that the at least one visual element is visible to the user and not visible to the camera, the plurality of lighted pixels are configured to emit light toward a location of the user away from the camera.

2. The system of claim 1, wherein the at least one visual element is one or more of text, a logo, an application window, a presentation slide, a drawing, a figure, a diagram, a chart, and a graph.

3. The system of claim 1, wherein:
   the transparent panel has a first plurality of lighted pixels and a second plurality of lighted pixels, the first plurality of lighted pixels being configured to emit light toward the location of the user away from the camera and the second plurality of lighted pixels being configured to emit light toward a location of the camera away from the user; and
   the processor is further configured to or programmed to control the display of the at least one visual element on the first plurality of lighted pixels and a display of a different visual element on the second plurality of lighted pixels.

4. The system of claim 1, wherein:
   the transparent panel has a first plurality of lighted pixels and a second plurality of lighted pixels, the first plurality of lighted pixels being configured to emit light toward the location of the user away from the camera and the second plurality of lighted pixels being configured to emit light toward a location of the camera away from the user; and
   the processor is further configured to or programmed to:
      control the display of the at least one visual element on the first plurality of lighted pixels; and
      control a display of a derivative of the at least one visual element on the second plurality of lighted pixels by processing the overlay signal to flip the at least one visual element of the overlay signal from left to right and utilizing a keying function to modify one or more components of the overlay signal, the keying function being one of a chrominance keying function, a luminance keying function and shape keying function.

5. The system of claim 1, wherein the processor is further configured to or programmed to:
   process the camera signal by flipping the image data of the camera signal from left to right;
   process the overlay signal by utilizing the keying function to remove and replace a background of the overlay signal;
   generate a second signal based on the processed camera signal and the processed overlay signal; and
   display a processed image of the second signal on a first display, the processed image being indicative of the at least one visual element overlaid on the image data of the user.

6. The system of claim 1, wherein the camera is positioned on a first side of the transparent panel, and the user is positioned on a second side of the transparent panel.

7. A method for production and presentation of video content comprising:
   receiving a camera signal from a camera positioned in front of a transparent panel, the camera signal indicative of image data of a user positioned behind the transparent panel;
   receiving, an overlay signal having at least one visual element;
   displaying the at least one visual element of the overlay signal on the transparent panel; and
   controlling a display of the at least one visual element on a plurality of lighted pixels of the transparent panel such that the at least one visual element is visible to the user positioned behind the transparent panel and not visible to the camera positioned in front of transparent panel, wherein the plurality of lighted pixels are configured to emit light toward a location of the user away from the camera.

8. The method of claim 7, wherein the at least one visual element is one or more of text, a logo, an application window, a presentation slide, a drawing, a figure, a diagram, a chart, and a graph.

9. The method of claim 7, further comprising:
controlling the display of the at least one visual element, projected by a projector having a shutter, on a sheet by controlling an opacity of the sheet and the shutter of the projector, wherein the sheet comprises a controllable opacity, the sheet being fixed to a portion or entirety of a surface of the transparent panel or being integrally formed with the transparent panel;
driving a first state for a first predetermined period where the sheet is semi-opaque and the shutter is open to display the at least one visual element on the semi-opaque sheet;
driving a second state for a second predetermined period where the sheet is transparent and the shutter is closed to preclude displaying the at least one visual element on the transparent sheet; and
cycling between the first state and the second state such that the at least one visual element is visible to the user in the first state and the camera captures an image without the at least one visual element in the second state, the cycling between the first state and the second state at a rate to enable persistence of vision to yield an impression to the user that the at least one visual element is continuously displayed.

10. The method of claim 7, further comprising:
controlling the display of the at least one visual element, projected by a projector projecting polarized light, onto a substrate of the transparent panel, the polarization of the projected polarized light being coordinated with a polarizing filter of the camera such that the projected polarized light is not visible to the camera.

11. The method of claim 7, further comprising:
controlling the display of the at least one visual element on a first plurality of lighted pixels of the transparent panel and a display of a different visual element on a second plurality of lighted pixels of the transparent panel, the first plurality of lighted pixels being configured to emit light toward the location of the user away from the camera and the second plurality of lighted pixels being configured to emit light toward a location of the camera away from the user.

12. The method of claim 7, further comprising:
controlling the display of the at least one visual element on a first plurality of lighted pixels of the transparent panel, the transparent panel comprising the first plurality of lighted pixels and a second plurality of lighted pixels, the first plurality of lighted pixels being configured to emit light toward a location of the user away from the camera and the second plurality of lighted pixels being configured to emit light toward a location of the camera away from the user; and
controlling a display of a derivative of the at least one visual element on the second plurality of lighted pixels by processing the overlay signal to flip the at least one visual element of the overlay signal from left to right and utilizing a keying function to modify one or more components of the overlay signal, the keying function being one of a chrominance keying function, a luminance keying function and shape keying function.

13. The method of claim 7, further comprising:
processing the camera signal by flipping the image data of the camera signal from left to right;
processing the overlay signal by utilizing the keying function to remove and replace a background of the overlay signal;
generating a second signal based on the processed camera signal and the processed overlay signal; and
displaying a processed image of the second signal on a first display, the processed image being indicative of the at least one visual element overlaid on the image data of the user.

14. The system of claim 7, wherein the camera is positioned on a first side of the transparent panel, and the user is positioned on a second side of the transparent panel.

15. A non-transitory computer-readable medium having computer readable instructions stored thereon for production and presentation of video content which, when executed by a processor, causes the processor to carry out the steps of:
receiving a camera signal from a camera positioned in front of a transparent panel, the camera signal indicative of image data of a user positioned behind the transparent panel;
receiving, an overlay signal having at least one visual element,
displaying the at least one visual element of the overlay signal on the transparent panel, and
controlling a display of the at least one visual element on a plurality of lighted pixels of the transparent panel such that the at least one visual element is visible to the user positioned behind the transparent panel and not visible to the camera positioned in front of transparent panel, wherein the plurality of lighted pixels are configured to emit light toward a location of the user away from the camera.

16. The non-transitory computer-readable medium of claim 15, wherein the at least one visual element is one or more of text, a logo, an application window, a presentation slide, a drawing, a figure, a diagram, a chart, and a graph.

17. A system for production and presentation of video content comprising:
a transparent panel;
a camera positioned adjacent to the transparent panel, the camera generating a camera signal indicative of image data of a user positioned on a side of the transparent panel opposing the camera;
a sheet having a controllable opacity, the sheet being fixed to a portion or entirety of a surface of the transparent panel or being integrally formed with the transparent panel;
a projector having a shutter;
a memory storing one or more instructions; and
a processor configured to or programmed to read the one or more instructions stored in the memory, the processor configured to or programmed to:
receive the camera signal;
receive an overlay signal having at least one visual element;
display the at least one visual element of the overlay signal on the transparent panel;
control a display of the at least one visual element, projected by the projector, on the sheet by controlling an opacity of the sheet and the shutter of the projector such that the at least one visual element is visible to the user and not visible to the camera;

drive a first state for a first predetermined period where the sheet is semi-opaque and the shutter is open to display the at least one visual element on the semi-opaque sheet;

drive a second state for a second predetermined period where the sheet is transparent and the shutter is closed to preclude displaying the at least one visual element on the transparent sheet; and cycle between the first state and the second state such that the at least one visual element is visible to the user in the first state and the camera captures an image without the at least one visual element in the second state, the processor cycling between the first state and the second state at a rate to enable persistence of vision to yield an impression to the user that the at least one visual element is continuously displayed.

* * * * *